(12) United States Patent
Alessi et al.

(10) Patent No.: US 12,543,975 B2
(45) Date of Patent: Feb. 10, 2026

(54) UNIVERSAL FRAGMENTED WIDEBAND TYMPANOMETRY

(71) Applicant: STMicroelectronics International N.V., Geneva (CH)

(72) Inventors: Enrico Rosario Alessi, Catania (IT); Fabio Passaniti, Syracuse (IT)

(73) Assignee: STMicroelectronics International N.V., Geneva (CH)

( * ) Notice: Subject to any disclaimer, the term of this patent is extended or adjusted under 35 U.S.C. 154(b) by 583 days.

(21) Appl. No.: 18/159,758

(22) Filed: Jan. 26, 2023

(65) Prior Publication Data
US 2024/0252063 A1    Aug. 1, 2024

(51) Int. Cl.
*A61B 5/12*    (2006.01)
*A61B 5/00*    (2006.01)

(52) U.S. Cl.
CPC ............ *A61B 5/126* (2013.01); *A61B 5/7246* (2013.01); *A61B 2560/0257* (2013.01); *A61B 2562/0247* (2013.01)

(58) Field of Classification Search
None
See application file for complete search history.

(56) References Cited

FOREIGN PATENT DOCUMENTS

| | | |
|---|---|---|
| CN | 106851460 A | 6/2017 |
| EP | 4085835 A1 | 11/2022 |
| WO | WO 2022/189688 A1 | 9/2022 |

OTHER PUBLICATIONS

Onusko et al. Tympanometry; Nov. 1, 2004 vol. 70, No. 9 American Family Physician (Year: 2004).*
Park, "Clinical Applications of Wideband Tympanometry," Korean J Otorhinolaryngol-Head Neck Surg, 60 (8):375-80 / pISSN 2092-5859 / eISSN 2092-6529, (2017).
Liu et al., "Wideband absorbance tympanometry using pressure sweeps: System development and results on adults with normal hearing," J. Acoust. Soc. AM, 124(6), (Dec. 2008).
Hein et al., "Wideband tympanometry," Advances in Cinical Audiology, edited by Stavros Hatzopoulos, DOI: 10.5772/67155, (Mar. 2017).
EP 24153877.6 Extended European Search Report mailed Jul. 8, 2024.
Sundgaard et al., "A Deep Learning Approach for Detecting Otitis Media From Wideband Tympanometry Measurements," IEEE Journal of Biomedical and Health Informatics, vol. 26, No. 7, (Jul. 2022).

* cited by examiner

*Primary Examiner* — Jay B Shah
(74) *Attorney, Agent, or Firm* — Alston & Bird LLP

(57) ABSTRACT

Various embodiments of the present disclosure disclose various tympanometry techniques. A tympanometry curve is generated for a user based at least in part on audio data indicative of a sound absorbance associated with a middle ear (ME) system over a fragment of an evaluation time period. A curve-pressure pair including the tympanometry curve and a correlating pressure measurement is generated and utilized to identify historical data indicative of a plurality of historical curve-pressure pairs with similar pressure measurements to the correlating pressure measurement. A performance metric is generated for the ME system of the user based at least in part on a comparison between the tympanometry curve and the historical data.

20 Claims, 14 Drawing Sheets

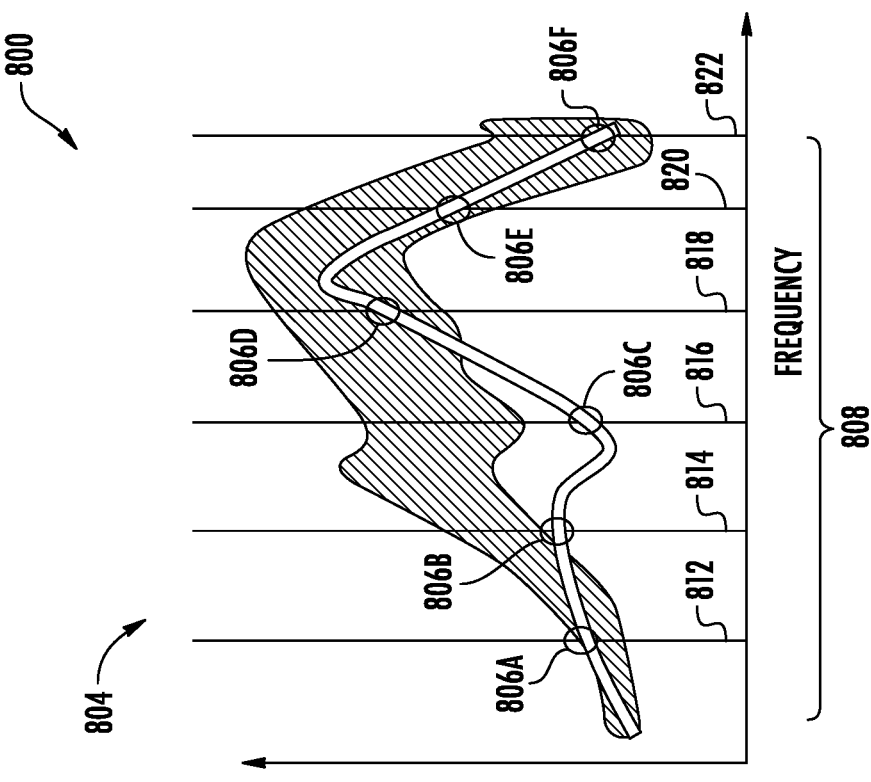
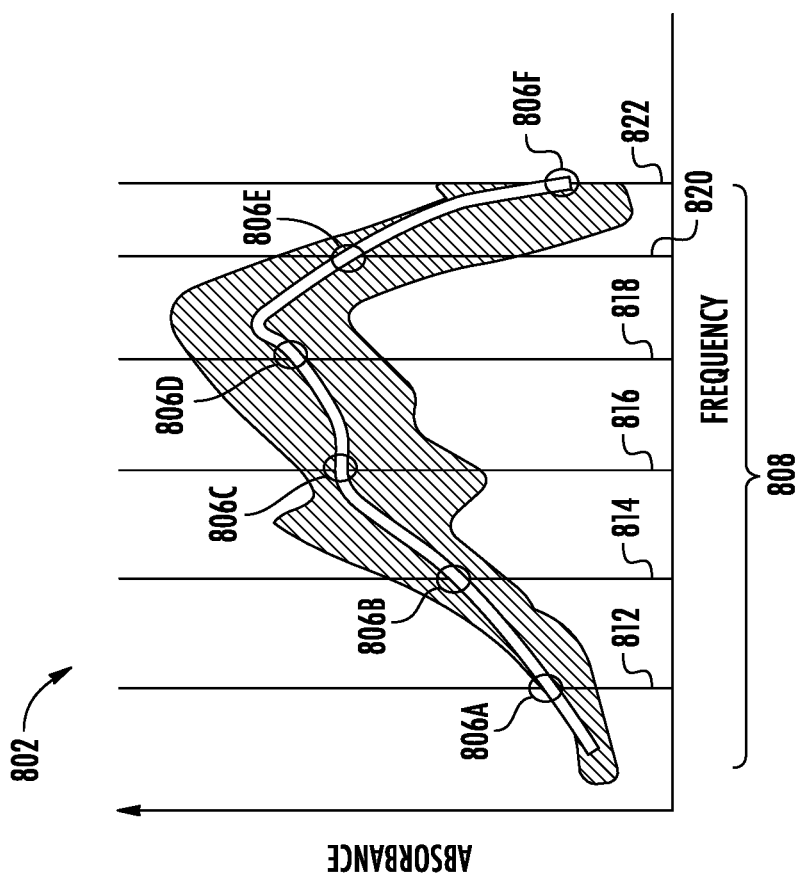
FIG. 8

UNIVERSAL FRAGMENTED WIDEBAND TYMPANOMETRY

TECHNOLOGICAL FIELD

Example embodiments of the present disclosure relate generally to tympanometry, and more particularly to systems and methods for fragmented wideband tympanometry techniques.

BACKGROUND

Applicant has identified many technical challenges and difficulties associated with wideband tympanometry techniques. Through applied effort, ingenuity, and innovation, Applicant has solved problems related to the restricted application of wideband tympanometry techniques by developing solutions embodied in the present disclosure, which are described in detail below.

BRIEF SUMMARY

Various embodiments described herein relate to systems, apparatuses, products, and methods for fragmented wideband tympanometry.

In accordance with some embodiments of the present disclosure, a computing system comprising one or more processors and a memory, configured to execute one or more instructions is provided. The computing system can be configured to generate a tympanometry curve based at least in part on audio data indicative of a sound absorbance associated with a middle ear (ME) system over an evaluation time period fragment; generate a curve-pressure pair comprising the tympanometry curve and a correlating pressure measurement; identify historical data indicative of a plurality of historical curve-pressure pairs based at least in part on the correlating pressure measurement, wherein a historical curve-pressure pair comprises a historical pressure measurement that is within a threshold distance from the correlating pressure measurement; generate a performance metric for the ME system based at least in part on the curve-pressure pair and the historical data; and output an indication of the performance metric to a user.

In accordance with some embodiments of the present disclosure, a method is provided. The method can include generating a tympanometry curve based at least in part on audio data indicative of a sound absorbance associated with a middle ear (ME) system over an evaluation time period fragment; generating a curve-pressure pair comprising the tympanometry curve and a correlating pressure measurement; identifying historical data indicative of a plurality of historical curve-pressure pairs based at least in part on the correlating pressure measurement, wherein a historical curve-pressure pair comprises a historical pressure measurement that is within a threshold distance from the correlating pressure measurement; generating a performance metric for the ME system based at least in part on the curve-pressure pair and the historical data; and outputting an indication of the performance metric to a user.

In accordance with some embodiments of the present disclosure, a computing apparatus, comprising: a processor; and a memory storing instructions that, when executed by the processor, configure the computing apparatus to perform operations is provided. The instructions cause the computing apparatus to generate a tympanometry curve based at least in part on audio data indicative of a sound absorbance associated with a middle ear (ME) system over an evaluation time period fragment; generate a curve-pressure pair comprising the tympanometry curve and a correlating pressure measurement; identify historical data indicative of a plurality of historical curve-pressure pairs based at least in part on the correlating pressure measurement, wherein a historical curve-pressure pair comprises a historical pressure measurement that is within a threshold distance from the correlating pressure measurement; generate a performance metric for the ME system based at least in part on the curve-pressure pair and the historical data; and output an indication of the performance metric to a user.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
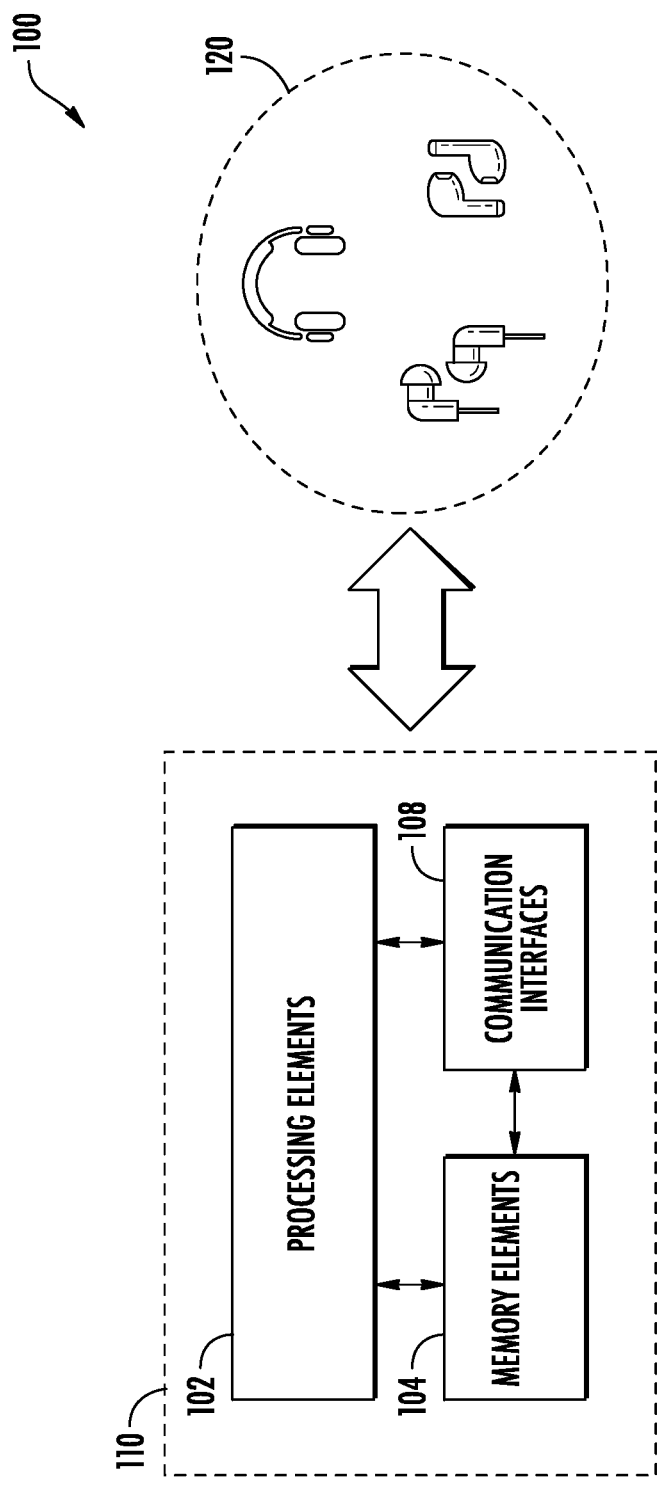
Figure 2:
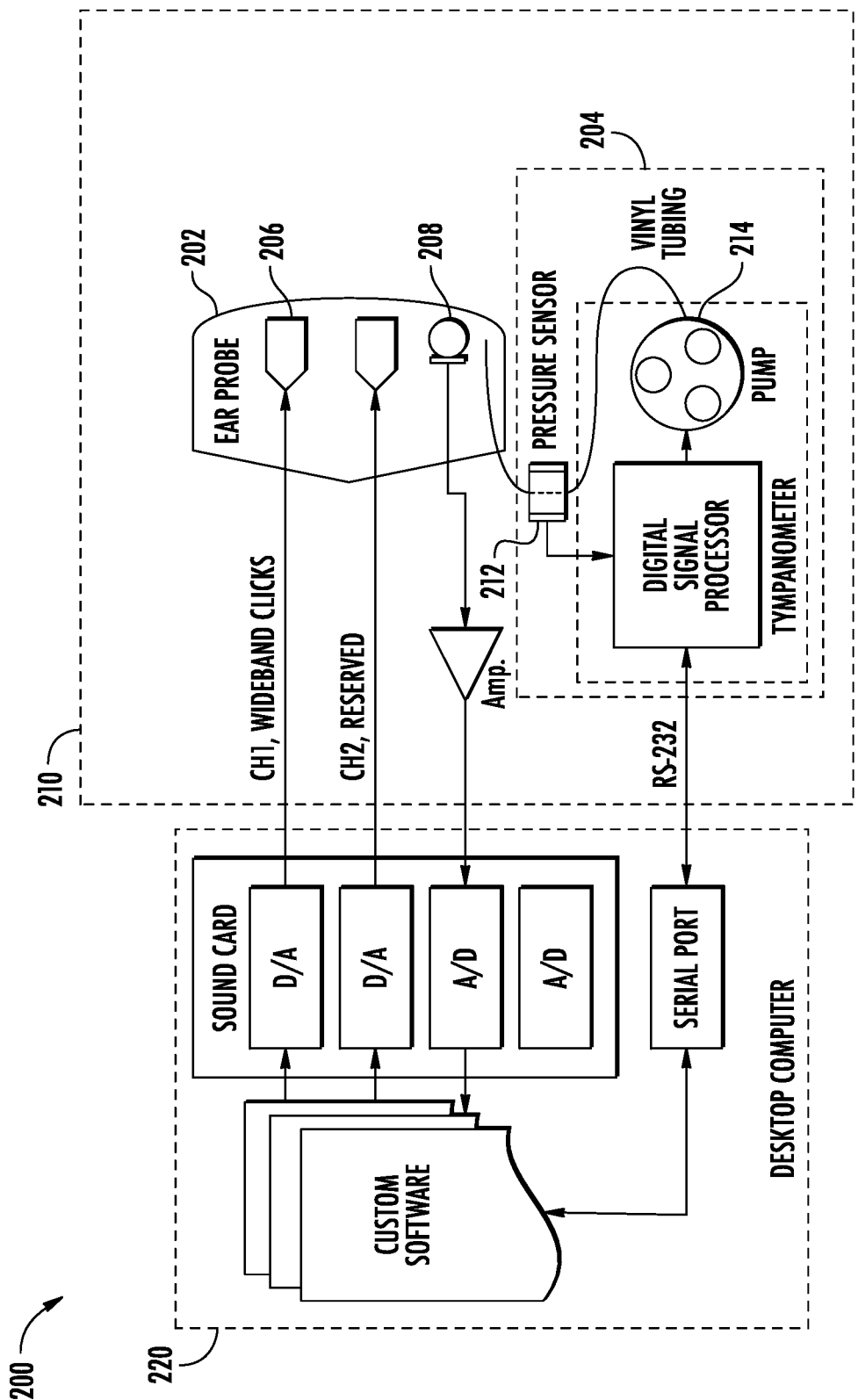
Figure 3:
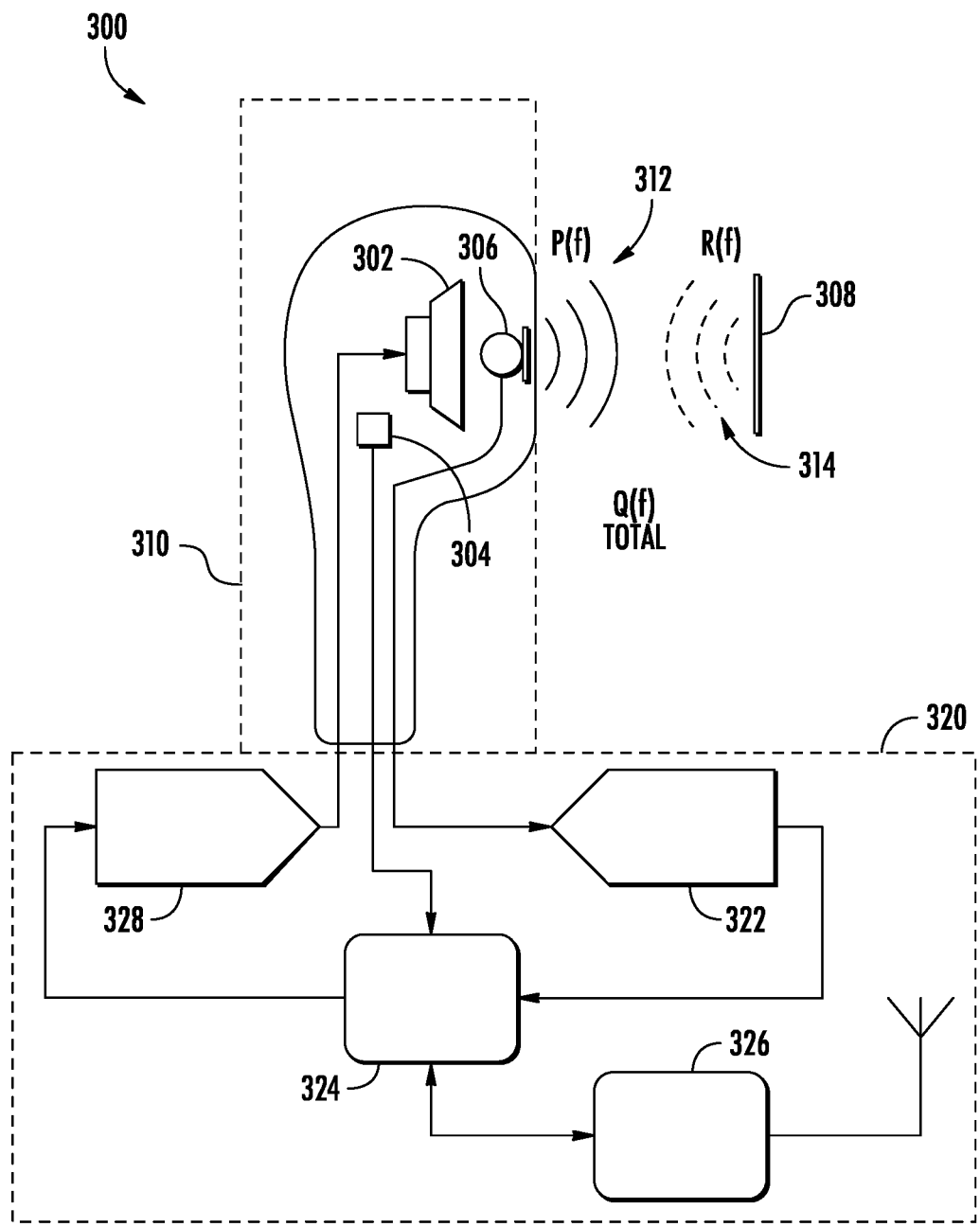
Figure 4:
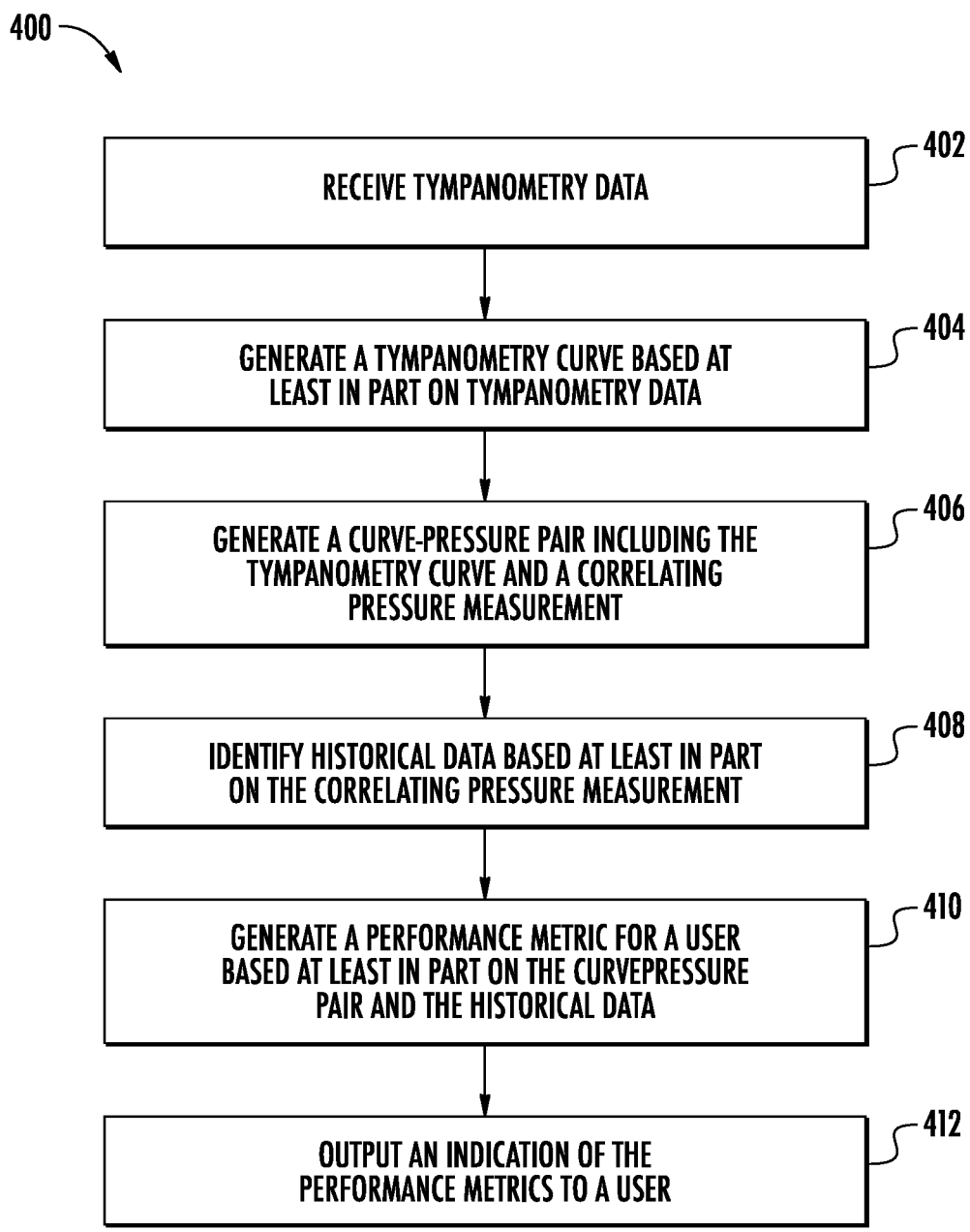
Figure 5:
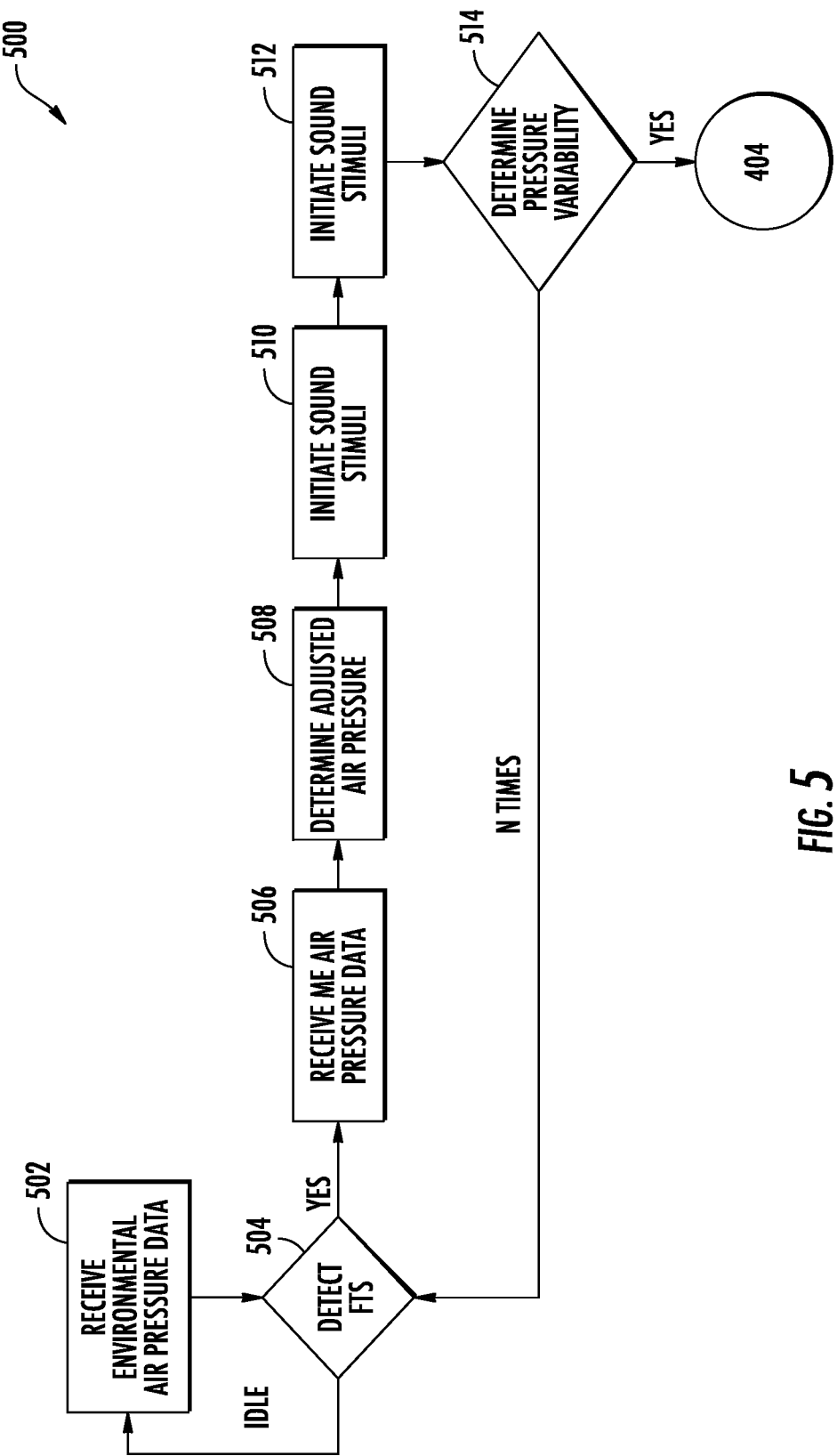
Figure 6:
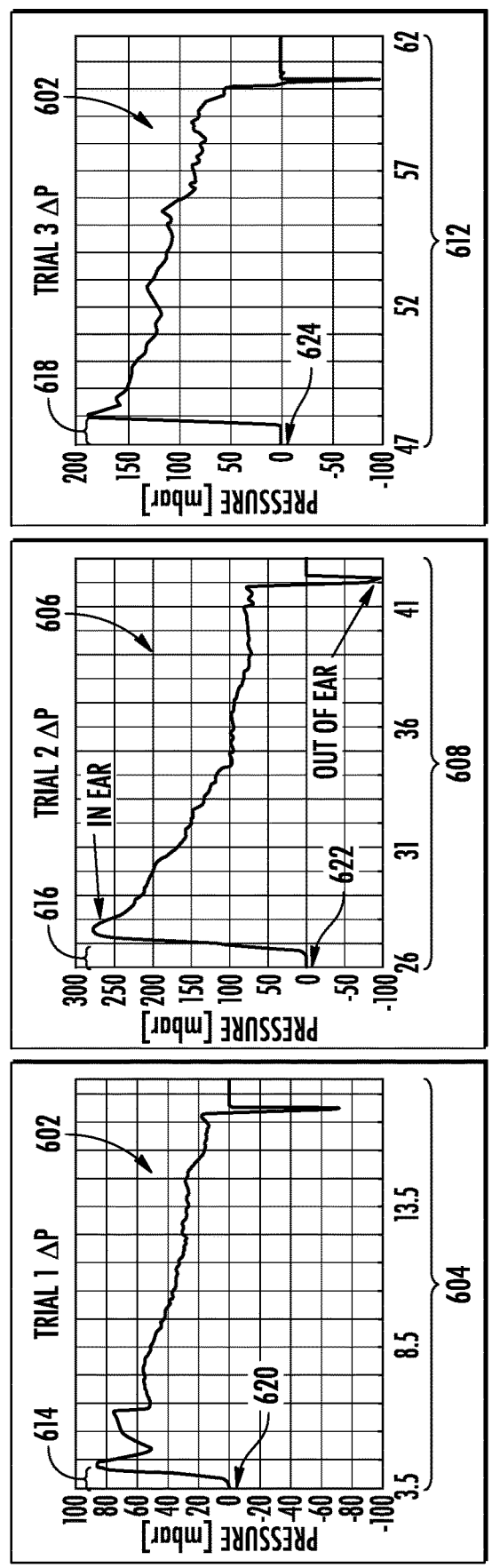
Figure 7:
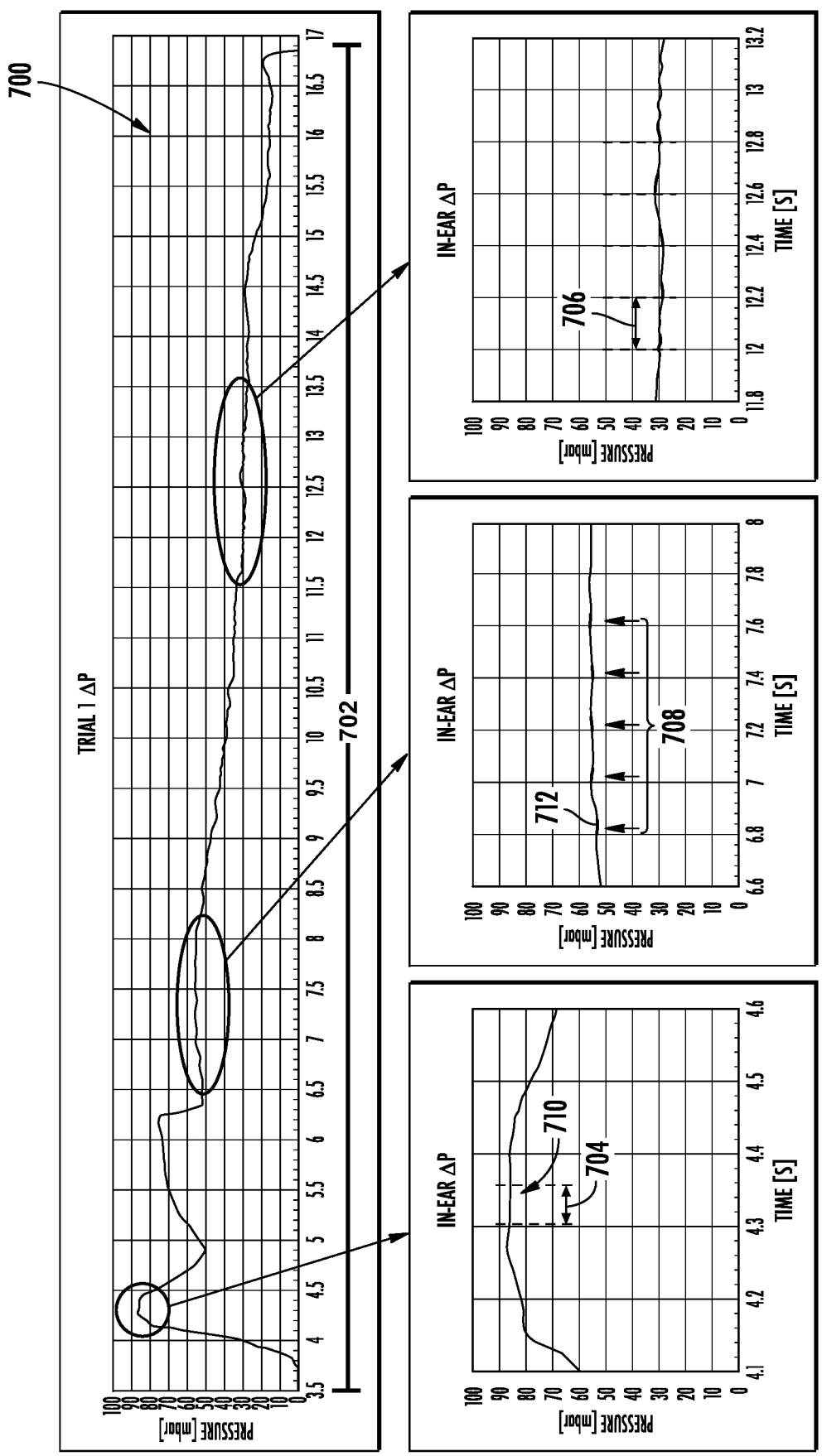
Figure 9:
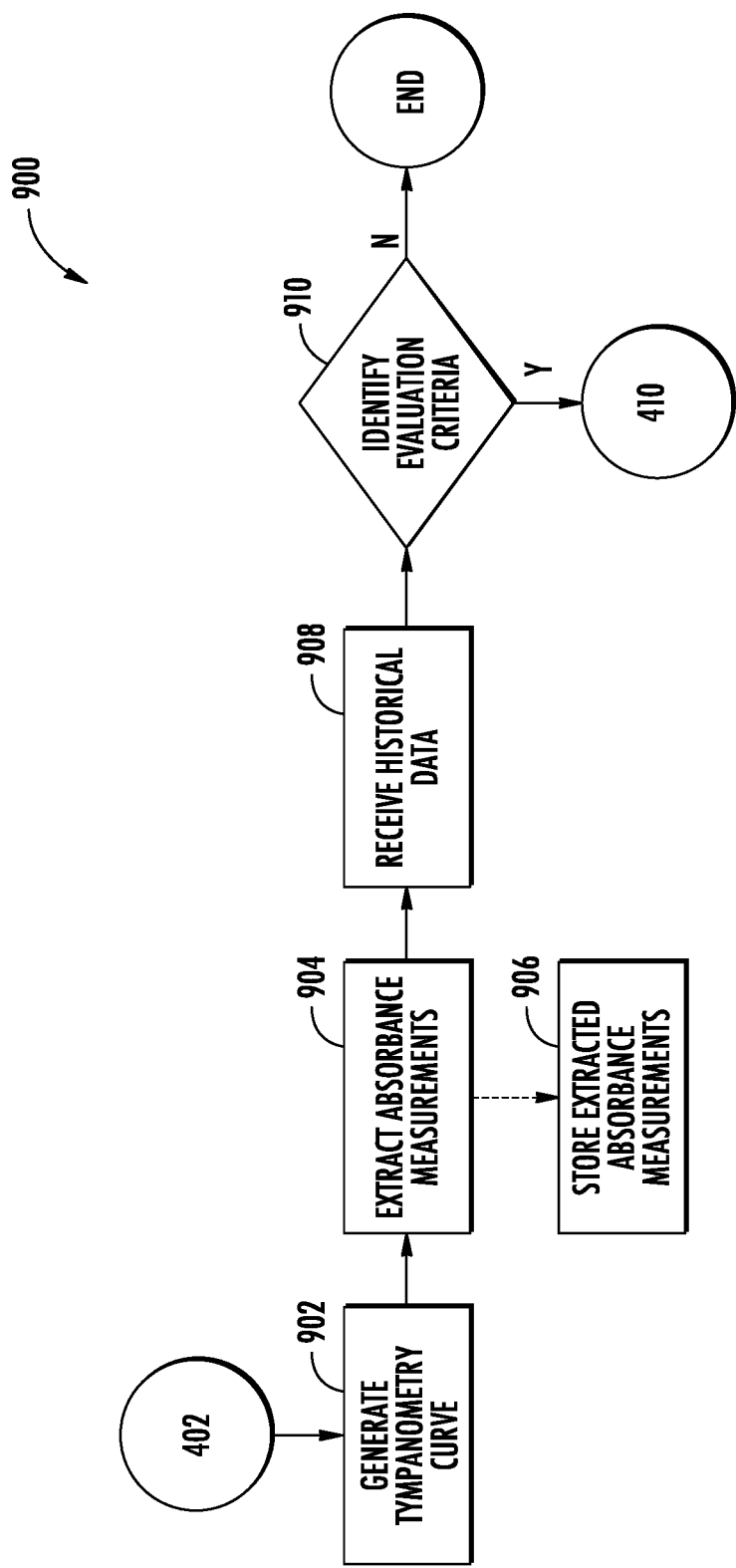
Figure 10:
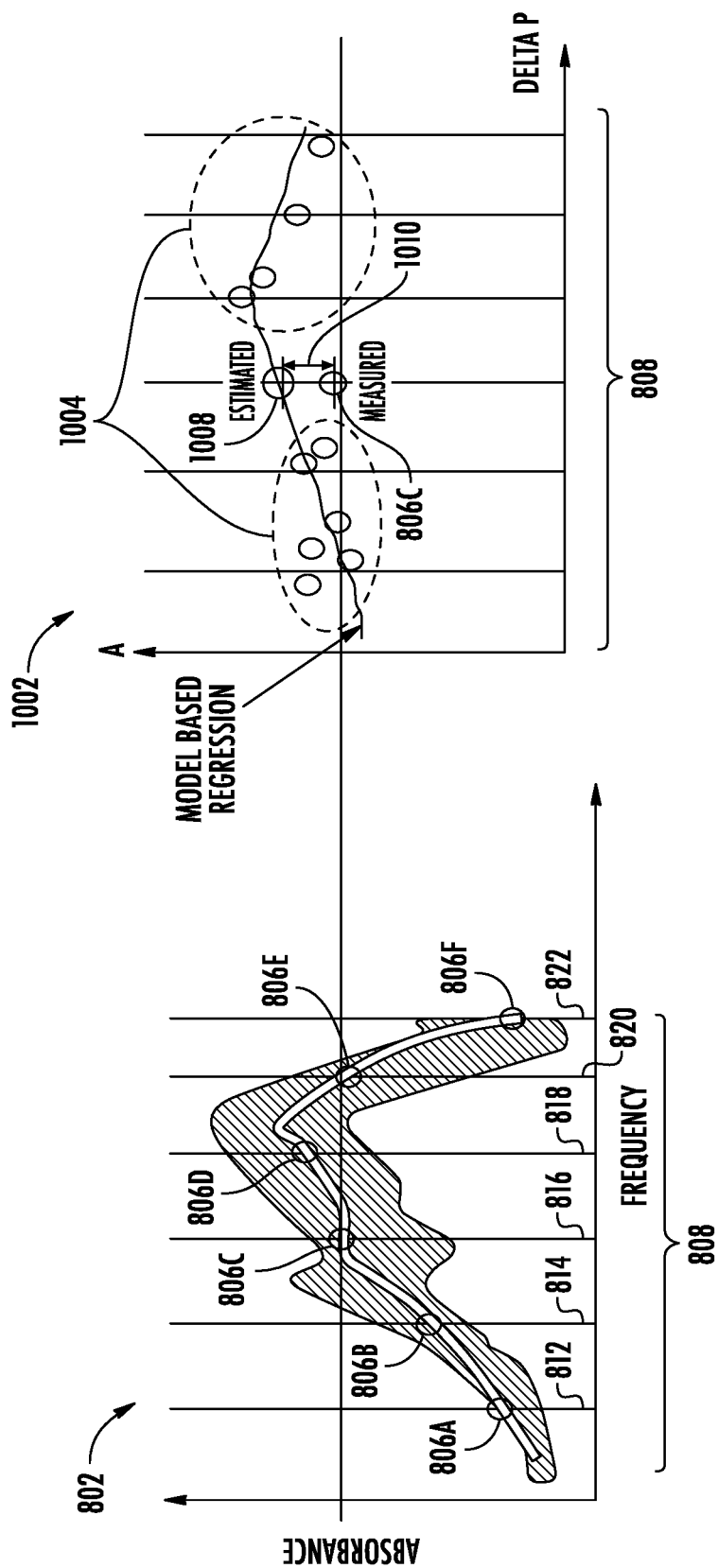
Figure 11:
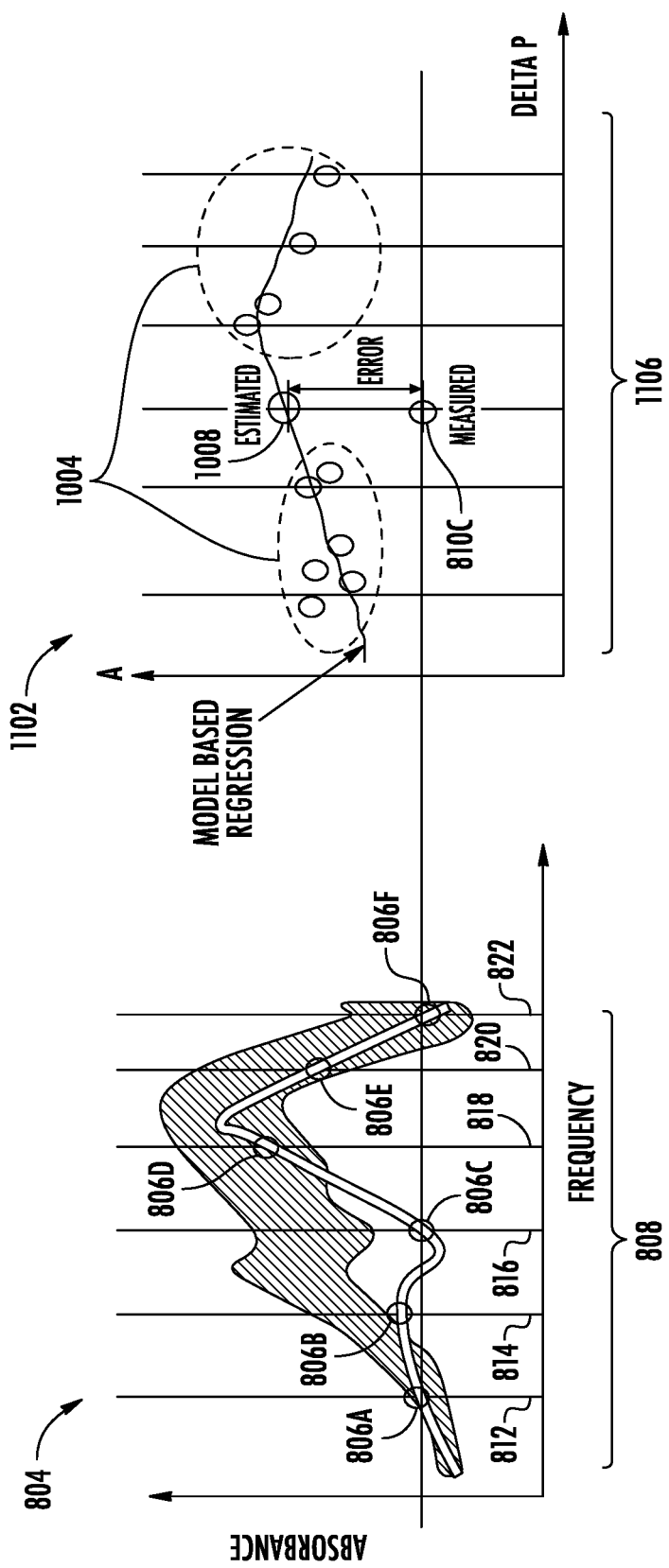
Figure 13:
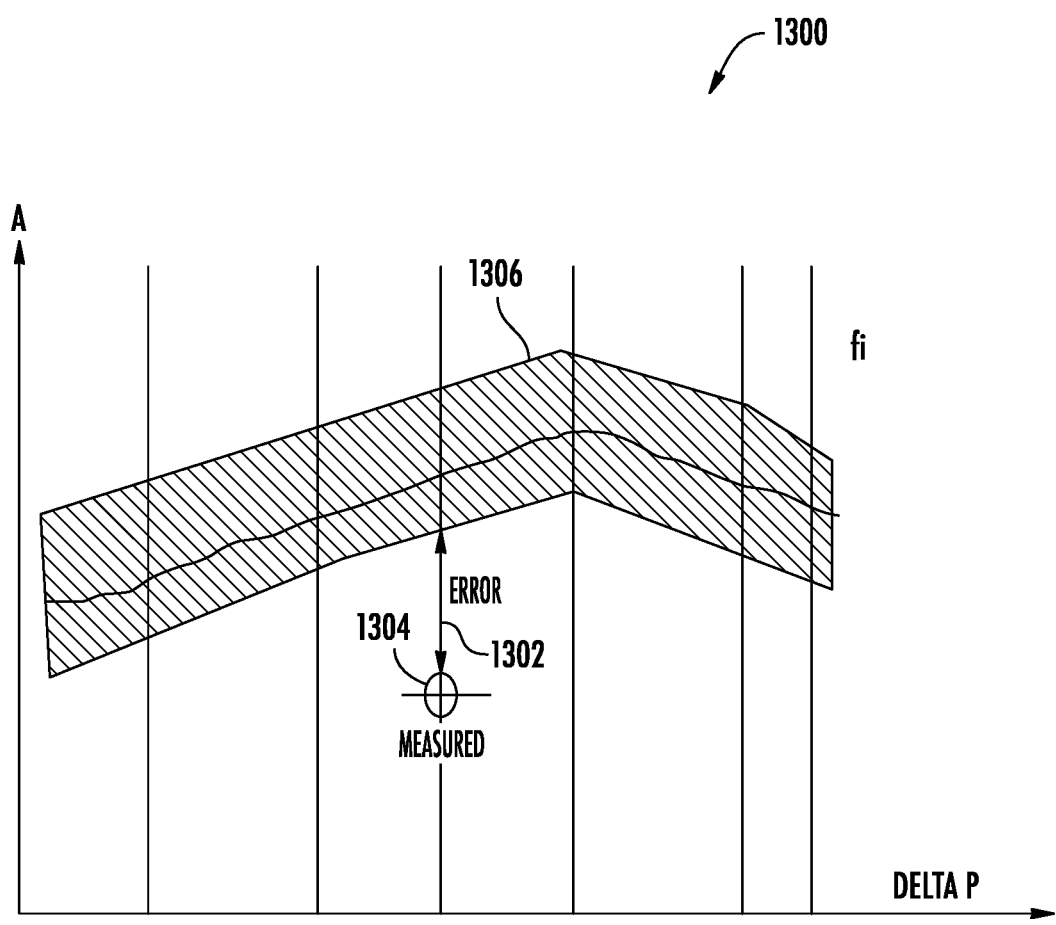
Figure 14:
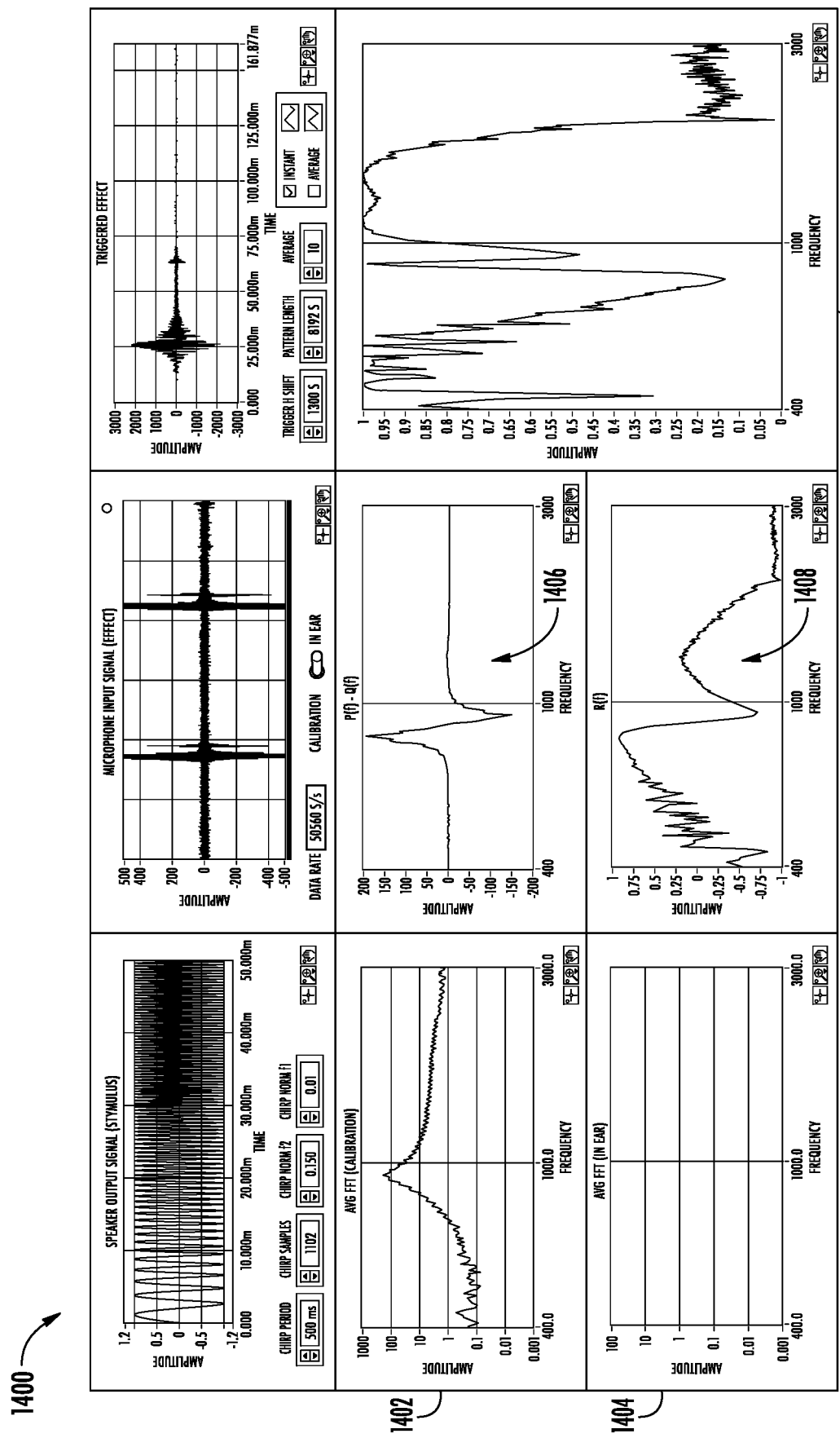

Having thus described certain example embodiments of the present disclosure in general terms, reference will now be made to the accompanying drawings, which are not necessarily drawn to scale, and wherein:

FIG. 1 illustrates an example computing entity in accordance with one or more embodiments of the present disclosure;

FIG. 2 illustrates an example tympanometry system configured with an air pump in accordance with one or more embodiments of the present disclosure;

FIG. 3 illustrates an example tympanometry system configured with a pressure sensor in accordance with one or more embodiments of the present disclosure;

FIG. 4 illustrates a flowchart of an example process according to an example method for performing one or more fragmented tympanometry techniques to generate auditory performance metrics for a user in accordance with one or more embodiments of the present disclosure;

FIG. 5 illustrates a block diagram of an example process according to an example method for performing a data monitoring phase of a fragmented tympanometry framework in accordance with one or more embodiments of the present disclosure;

FIG. 6 illustrates operational examples of air pressure measurements for a fragmented tympanometry framework in accordance with one or more embodiments of the present disclosure;

FIG. 7 illustrates an operational example of a tympanometry test over an evaluation time period in accordance with one or more embodiments of the present disclosure;

FIG. 8 illustrates a block diagram of an example process according to an example method for performing an initial audio data processing phase of the fragmented tympanometry framework in accordance with one or more embodiments of the present disclosure;

FIG. 9 illustrates operational examples of tympanometry curves according to some example embodiments of the present disclosure;

FIGS. 10-11 illustrate operational examples of historical data for an absorbance measurement in accordance with one or more embodiments of the present disclosure;

FIG. 13 illustrates an operational example of a population-based auditory error detection for a user in accordance with one or more embodiments of the present disclosure; and FIG. 14 illustrates an example calibration technique for a tympanometry system in accordance with one or more embodiments of the present disclosure.

DETAILED DESCRIPTION

Embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Various example embodiments of the present disclosure are directed to improved systems, apparatuses, products, and methods for administering wideband tympanometry tests and evaluating data from such tests. The present disclosure, in some examples, describes a fragmented wideband tympanometry technique that compensates for the lack of tympanometry specific components when administering a wideband tympanometry test. By doing so, example fragmented wideband tympanometry techniques of the present disclosure can enable the use of tympanometry testing across a wide variety of audio systems/devices including, for example, consumer grade audio devices in which tympanometry specific components such as air pumps, pump regulators, tympanometers, and/or the like may be impractical. In this way, various embodiments of the present disclosure enable, in some examples, the ubiquitous evaluation of hearing impairment for populations of users that may not have access to tympanometry specific equipment.

By way of example, sound stimuli can be modified by alterations of a user's middle ear (ME) system's functionality. Using tympanometry tests, a user's ME system's function can be evaluated to detect hearing impairment. Tympanometry tests, for example, can measure alterations in the sound absorbance characteristics of a user's ME system as pressure in the external acoustic canal is modified. Wideband tympanometry (WBT) tests can assess a user's ME function with a transient wideband stimulus in order to capture the ME behavior at a wide range of frequencies. Each wideband tympanometry measurement can include an indication of a user's ME system's absorbance characteristics as a function of (i) air pressure and (ii) sound frequency. Tympanometry systems may, in some examples, ensure constant air pressure within the external acoustic canal of a user to measure consistent absorbance characteristics across each of a plurality of transient wideband stimuli. To do so, such systems can utilize audio devices that include tympanometry specific components such as, for example, tympanometers, air pumps, pump regulators, and/or the like which are designed to manipulate the air pressure within the external acoustic canal of a user during a tympanometry test. These components, in some examples, can be expensive, bulky, and not suitable for earphones or other audio devices such as true wireless stereos utilized in the consumer market.

Some embodiments described herein improve upon tympanometry techniques by generating absorbance measurements based at least in part on constant pressure measurements during a fragment, portion, or subset of an evaluation time period using fragmented tympanometry techniques. The fragmented tympanometry techniques include conducting a tympanometry test when a user's ME system is sealed by any audio device. During the test, air pressure within the external acoustic canal of a user is monitored or otherwise detected by a pressure sensor. Fragments of time can be detected during the test in which the pressure within the user's external acoustic canal is consistent. In response to detecting a consistent specific pressure over a time fragment, a tympanometry curve for the time fragment can be generated and correlated with the specific pressure. The tympanometry curve can be compared to previously detected tympanometry curves that correspond to the specific pressure to detect hearing impairment for a user. In this way, a user's ME functionality, and potential hearing impairment, can be evaluated without, in some examples, manipulating the air pressure within the user's external acoustic canal. This, in turn, eliminates the need for tympanometry specific components such as air pumps, and/or like which enables the use of tympanometry techniques across a wide variety of audio devices including consumer grade true wireless stereo systems.

It should be readily appreciated that the embodiments of the systems, apparatus, and methods described herein may be configured in various additional and alternative manners in addition to those expressly described herein.

FIG. 1 illustrates an example computing system 100 in accordance with one or more embodiments of the present disclosure. In general, the terms computing system, computer, system, device, entity, and/or similar words used herein interchangeably can refer to, for example, one or more computers, computing entities, desktops, mobile phones, tablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

The computing system 100 can include a computing apparatus 110 and/or one or more external computing entities 120 communicatively coupled to the computing apparatus 110 using one or more wired and/or wireless communication techniques. The computing apparatus 110 can include any computing device including, for example, a tympanometry processing apparatus configured to perform one or more steps/operations of one or more fragmented tympanometry techniques described herein. In some embodiments, the computing apparatus 110 can include and/or be in association with one or more mobile device(s), desktop computer(s), laptop(s), server(s), cloud computing platform(s), and/or the like. In some example embodiments, the computing apparatus 110 can be configured to receive and/or transmit tympanometry instructions, data, and/or the like between the one or more external computing entities 120 to perform one or more steps/operations of one or more fragmented tympanometry techniques described herein.

The external computing entities 120, for example, can include and/or be associated with one or more audio devices. The one or more audio devices, for example, can include one or more audio components configured to output and/or receive audio data. By way of example, the audio components can include one or more microphones, stereos, speakers, headphones, headsets, and/or the like. In some embodiments, for example, the external computing entities 120 can include and/or be in association with one or more true wireless stereos, one or more wired stereos, one or more headsets, and/or the like. In some example embodiments, the external computing entities 120 can be configured to receive and/or transmit tympanometry instructions, data, and/or the like from/to the computing apparatus 110 to perform one or more steps/operations of one or more fragmented tympanometry techniques described herein. In some embodiments, the external computing entities 120 can include tympanometry specific components (e.g., tympanometers, air pumps, and/or the like) to facilitate one or more tympanometry techniques. As described herein, one or more fragmented tympanometry techniques of the present disclosure can be implemented with any external computing entity including those with tympanometry specific components and those without tympanometry specific components.

The computing apparatus 110 can include, or be in communication with, one or more processing elements 102 (also referred to as processors, processing circuitry, digital circuitry, and/or similar terms used herein interchangeably) that communicate with other elements within the computing apparatus 110 via a bus, for example. As will be understood, the processing element 102 can be embodied in a number of different ways.

For example, the processing element 102 can be embodied as one or more complex programmable logic devices (CPLDs), microprocessors, multi-core processors, coprocessing entities, application-specific instruction-set processors (ASIPs), microcontrollers, and/or controllers. Further, the processing element 102 can be embodied as one or more other processing devices or circuitry. The term circuitry can refer to an entirely hardware embodiment or a combination of hardware and computer program products. Thus, the processing element 102 can be embodied as integrated circuits, application specific integrated circuits (ASICs), field programmable gate arrays (FPGAs), programmable logic arrays (PLAs), hardware accelerators, digital circuitry, and/or the like.

As will therefore be understood, the processing element 102 can be configured for a particular use or configured to execute instructions stored in volatile or non-volatile media or otherwise accessible to the processing element 102. As such, whether configured by hardware or computer program products, or by a combination thereof, the processing element 102 can be capable of performing steps or operations according to embodiments of the present disclosure when configured accordingly.

In one embodiment, the computing apparatus 110 can further include, or be in communication with, one or more memory elements 104. The one or more memory elements 104 can include non-volatile and/or volatile media. The memory elements 104, for example, can include non-volatile media (also referred to as non-volatile storage, memory, memory storage, memory circuitry and/or similar terms used herein interchangeably). In one embodiment, the non-volatile storage or memory can include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity-relationship model, object model, document model, semantic model, graph model, and/or the like.

In addition, or alternatively, the memory elements 104 can include volatile memory. For example, the computing apparatus 110 can further include, or be in communication with, volatile media (also referred to as volatile storage memory, memory storage, memory circuitry and/or similar terms used herein interchangeably). In one embodiment, the volatile storage or memory can also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 102. Thus, the databases, database instances, database management systems, data, applications, programs, program modules, scripts, source code, object code, byte code, compiled code, interpreted code, machine code, executable instructions, and/or the like can be used to control certain aspects of the operation of the computing apparatus 110 with the assistance of the processing element 102 and operating system.

As indicated, in one embodiment, the computing apparatus 110 can also include one or more communication interfaces 108 for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing apparatus 110 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The computing system 100 can include input/output circuitry for communicating with one or more users. The input/output circuitry, for example, can include one or more user interfaces for providing and/or receiving information from one or more users of the computing system 100. The input/output interfaces can include one or more tactile interfaces (e.g., keypads, touch screens, etc.), one or more audio interfaces (e.g., microphones, speakers, etc.), visual interfaces (e.g., display devices, etc.), and/or the like. The input/output circuitry can be configured to receive user input through one or more of the user interfaces from a user of the computing system 100 and provide data to a user through the one or more of the user interfaces.

FIG. 2 illustrates an example tympanometry system 200 in accordance with one or more embodiments of the present disclosure. The tympanometry system 200 can include an audio device 210 with tympanometry specific components 204 communicatively coupled to a tympanometry processing apparatus 220. The audio device 210 can include audio components 202 and tympanometry specific components 204 that are collectively (and/or individually) operable to perform a tympanometry test to evaluate the performance of a user's ME. The audio components 202 can be utilized for one or more audio activities such as, for example, listening to media, and/or the like. The tympanometry specific components 204 may be redundant for activities other than tympanometry testing.

In some embodiments, the audio components 202 can be included in an ear probe and can include one or more speakers 206, one or more microphones 208, and/or any other component capable of transmitting and/or receiving acoustic signals. The audio components 202 and/or a portion thereof, can include one or more components available and/or utilized by audio devices such as, for example, earphones, headsets, true wireless stereos, and/or the like.

In some embodiments, the tympanometry specific components 204 can be included in a tympanometer and can include one or more pressure sensors 212, one or more air pumps 214, and/or digital signal processors 216 configured to maintain, adjust, and/or otherwise handle air pressure within an ME system of a user. The tympanometry specific components 204 and/or a portion thereof, can be leveraged specifically for a tympanometry test and can be unavailable, redundant, and/or cost/space prohibitive in audio devices such as, for example, earphones, headsets, true wireless stereos, and/or the like.

The audio components 202 and tympanometry specific components 204 can be communicatively coupled (e.g., through one or more wired and/or wireless communication networks, etc.) to the tympanometry processing apparatus 220. The audio component 202, for example, can include a receiver configured to receive one or more instructions from the tympanometry processing apparatus 220 for implementing one or more wideband clicks via the speakers 206 to initiate a tympanometry test. The one or more wideband clicks, for example, can include a plurality of acoustic signals initiated into an ME system of a user. In some embodiments, a single wideband click can be utilized to cover a plurality of different frequencies across a frequency range of 216 to 8000 Hz. For example, the tympanometry test can include wideband tympanometry (WBT) techniques in which ME system function is assessed with a transient wideband stimulus in order to capture ME system behavior at a wide range of frequencies.

The response to the sound stimuli (e.g., transient wideband stimulus) can be modified by alterations of the ME system functionality. These modifications can be recorded by the microphones 208 and provided to the tympanometry processing apparatus 220 for assessment. The assessment of the ME system function can be utilized to generate auditory performance metrics for the user. The modifications recorded by the microphones 208 can include auditory measurements which can be assessed as a function of the air pressure within an ME system at the time the measurements are captured to generate absorbance measurements. For example, the absorbance measurements can represent alterations in the sound absorbance characteristics of the ME system as the pressure in the external acoustic canal is modified. An absorbance measurement, for example, can include a value from zero to one in which one represents that all energy has been absorbed by the ME system. Each absorbance measurement, a, can be computed as the sound power density (intensity) absorbed by the ME system, la, divided by the intensity impinging on the ME system, li, such that:

$$a = \frac{la}{li}.$$

The tympanometry specific components 204 of the audio device 210 are configured to regulate the air pressure within an ME system of a user to enable accurate absorbance measurements for the tympanometry process. However, such components can be universally impractical and can be restricted to specific medical devices. Air pumps 214, for example, can be impractical for consumer devices such as true wireless stereo systems which prevent their everyday use. The embodiments described herein improve upon tympanometry systems by facilitating the accurate analysis of absorbance measurements in an uncontrolled pressurized environment in which the tympanometry specific components 204 are not utilized.

FIG. 3 illustrates an example tympanometry system 300 in accordance with one or more embodiments of the present disclosure. The tympanometry system 300 can include an audio device 310 without tympanometry specific components. The audio device 310, for example, can include any consumer grade wired and/or wireless stereo device such as, for example, various true wireless stereo devices. The audio device 310 can include audio components that can be individually operable to perform one or more fragmented tympanometry techniques described herein to evaluate the performance of a user's ME system 308. In addition to tympanometry, the audio components can be utilized for one or more auditory activities such as, for example, listening to media, and/or the like.

The audio device 310 can include one or more speakers 302, one or more air pressure sensors 304, and/or one or more microphones 306. The one or more microphones 306 can include at least one ME system microphone oriented with respect to the ME system 308 of a user. In addition, or alternatively, the one or more microphones can include additional microphones such as dual beamforming microphones, and/or the like.

The audio device 310 can be communicatively coupled (e.g., via one or more wired and/or wireless networks) to a tympanometry processing apparatus 320. The tympanometry processing apparatus 320 can include any computing device capable of performing one or more operations and/or steps of one or more fragmented tympanometry techniques described herein. By way of example, the tympanometry processing apparatus 320 can include one or more processors 324 and/or memories. The one or more memories can store instructions that, when executed by the processor, configure the tympanometry processing apparatus 320 to perform the one or more operations and/or steps of one or more fragmented tympanometry techniques described herein. In some embodiments, the tympanometry processing apparatus 320 can include one or more mobile device(s), desktop computer(s), laptop(s), and/or the like. In some embodiments, the tympanometry processing apparatus 320 can leverage one or more server(s), cloud computing platform(s), and/or the like to perform the one more operations and/or steps of one or more fragmented tympanometry techniques described herein.

The tympanometry processing apparatus 320 can be configured to receive and/or transmit tympanometry data and/or instructions from/to the audio device 310 via one or more communication interfaces 326 to implement one or more fragmented tympanometry techniques described herein.

By way of example, the tympanometry processing apparatus 320 can be configured to receive air pressure data from the one or more air pressure sensors 304 of the audio device 310. The air pressure data can correspond to one or more times of an evaluation time period. The air pressure data, for example, can include a plurality of different air pressure measurements indicative of varying air pressures within the external acoustic canal of a user.

In some embodiments, the tympanometry processing apparatus 320 can be configured to instruct the audio device 310 to initiate one or more sound stimuli. For example, the tympanometry processing apparatus 320 can generate digital incident wave data representative of one or more wideband clicks and provide analog incident wave data, using one or more digital to analog circuits 328, to the audio device 310 to implement the one or more one or more wideband clicks via the speakers 302 of the audio device 310. The one or more wideband clicks can provide an incident wave 312 to the ME system 308 of the user.

The incident wave 312 can reflect from the ME system 308 (e.g., an ear drum, etc.), back to the microphones 306, as the reflected wave 314. The audio device 310 can generate, using the microphones 306, analog reflected wave data indicative of the reflected wave 314. The analog reflected wave data can be provided to the tympanometry processing apparatus 320. The tympanometry processing apparatus 320 can convert, using one or more analog to digital circuits 322, the analog reflected wave data to digital reflected wave data to evaluate the performance of an ME system 308 of a user.

For example, the tympanometry processing apparatus 320 can compare the incident wave data indicative of the incident wave 312 to the digital reflected wave data indicative of the reflected wave 314 to generate tympanometry data comprising a plurality of absorbance measurements for an ME system 308 of the user. Each of the absorbance measurements can be representative of an amount of energy absorbed by an ME system 308 of a user during an evaluation time period. As described herein, the tympanometry processing apparatus 320 can leverage one or more of the fragmented tympanometry techniques described herein to generate performance metrics for a user based at least in part on the plurality of absorbance measurements and the pressure data over the evaluation time period. The tympanometry system 300, for example, can utilize historical information to generate the performance metrics based at least in part on varying pressure measurements without the use of tympanometry specific components such as tympanometers, air pumps, and/or the like to regulate air pressure within the ME system 308 of the user.

FIG. 4 illustrates a flowchart of an example process 400 according to an example method for performing one or more fragmented tympanometry techniques to generate auditory performance metrics for a user in accordance with one or more embodiments of the present disclosure. The process 400 leverages fragmented data processing techniques to generate accurate auditory performance metrics without the use of tympanometry specific components; such as tympanometers, synchronized air pumps, pump regulation systems, and/or the like, thereby enabling the use of tympanometry techniques across a plurality of different audio devices (e.g., consumer grade true wireless stereo, and/or the like). The process 400 can be implemented by one or more computing devices, entities and/or systems described herein. For example, the process 400 includes a plurality of steps/operations one or more of which can be implemented by the computing system 100, the tympanometry system 200, the tympanometry system 300, and/or one or more combinations thereof.

FIG. 4 illustrates an example process 400 for explanatory purposes. Although the example process 400 depicts a particular sequence of steps/operations, the sequence may be altered without departing from the scope of the present disclosure. For example, some of the steps/operations depicted may be performed in parallel or in a different sequence that does not materially impact the function of the process 400. In other examples, different components of an example device or system that implements the process 400 may perform functions at substantially the same time or in a specific sequence.

According to some examples, the process 400 includes, at step/operation 402, receiving tympanometry data. For example, the computing system 100 can receive the tympanometry data. The tympanometry data can include audio data, pressure data, and/or any other information associated with one or more absorbance measurements for an ME system of a user. In some embodiments, the tympanometry data can be received at least in part from one or more audio devices of the computing system 100. For example, as described herein, the audio devices can include devices such as, for example, audio device 210 with tympanometry specific components (e.g., air pumps, etc.) specially designed for tympanometry techniques and/or devices such as, for example, audio device 310 without tympanometry specific components (e.g., air pumps, etc.).

In some example embodiments, one or more of the fragmented data processing techniques of the present disclosure can be associated with a fragmented data processing framework. The computing system 100 can receive the tympanometry data during a first phase of the fragmented data processing framework. By way of example, the process 400 can include one or more different phases of the fragmented tympanometry framework. According to some examples, the one or more different phases can include a first, data monitoring phase; a second, initial data processing phase; and/or a third, metric generation phase. In some embodiments, each phase of the fragmented tympanometry framework can be performed in response to one or more determinations in a previous phase. According to some embodiments, for example, the computing system 100 can receive the tympanometry data during a data monitoring phase and perform the second, initial data processing phase based at least in part on the tympanometry data.

FIG. 5 illustrates a block diagram of an example process 500 according to an example method for performing a data monitoring phase of the fragmented tympanometry framework in accordance with one or more embodiments of the present disclosure. The process 500 can be implemented by one or more computing devices, entities and/or systems described herein. For example, the process 500 includes a plurality of steps/operations one or more of which can be implemented by the computing system 100, the tympanometry system 200, the tympanometry system 300, and/or one or more combinations thereof.

FIG. 5 illustrates an example process 500 for explanatory purposes. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

The process 500 can include receiving tympanometry data for an ME system of a user over one or more steps/operations. The tympanometry data can include audio data and/or pressure data generated, measured, and/or received over one or more different time periods. The tympanometry data (e.g., audio data, pressure data, and/or the like) can be generated, measured, and/or the like by one or more sensors of one or more audio devices of the computing system 100.

In example embodiments, the audio data can be indicative of one or more absorptance metrics for an ME system of a user. For instance, the absorptance metrics can include incident wave data and reflective wave data that can be compared to generate one or more absorbance measurements for an ME system of a user.

The incident wave data, for example, can be descriptive of an incident wave including one or more emitted acoustic signals emitted (e.g., by one or more speakers of an audio device) to an ME system of a user. The emitted acoustic signals, for example, can be based at least in part on sound stimuli provided by the computing system 100 to perform a tympanometry test. In some example embodiments, the sound stimuli can include one or more wideband click stimuli. A wideband click stimulus can include a plurality of acoustic signals that span a broad frequency range over a measurement time period. In some embodiments, the frequency range can include a range between two hundred and twenty hertz to eight thousand hertz. In some embodiments, the measurement time period can include fifty millisecond pulse duration.

The reflected wave data can be descriptive of a reflective wave including one or more reflected acoustic signals received (e.g., by one or more microphones of an audio device) from the ME system of the user in response to the incident wave. The reflected acoustic signals, for example, can be based at least in part on the sound stimuli provided by the computing system 100 to perform the tympanometry test. By way of example, the reflected acoustic signals can include a plurality of acoustic signals reflected from the ME system of the user in response to the sound stimuli provided by the computing system 100.

In example embodiments, the pressure data can include air pressure data. The air pressure data can include environmental air pressure data and/or ME system air pressure data. The environmental air pressure data can be indicative of an ambient air pressure within an environment of the computing system 100 (e.g., computing apparatus 110, external computing entities 120, and/or the like). The ME system air pressure data can be indicative of an air pressure within an external acoustic canal of a user.

In some embodiments, the air pressure data can include a plurality of air pressure measurements generated using one or more units of air pressure corresponding to a respective time stamp. The units of air pressure can include any unit of measurement for measuring air pressure such as, for example, a plurality of pascals, and/or the like. By way of example, in some embodiments, an air pressure measurement can include a plurality of positive and/or negative mbars (millibar) indicative of one hundred pascals and/or one thousand dynes per square centimeter. The time stamp can be indicative of an absolute and/or a relative time. The absolute time can be indicative of a time of day. The relative time can be indicative of a time relative to a time period such as, for example, an evaluation time period during which one or more fragmented tympanometry steps/operations can be performed.

According to some examples, the process 500 includes, at step/operation 502, receiving environmental pressure data. For example, the computing system 100 can receive the environmental air pressure data. The environmental air pressure data can include a plurality of environmental air pressure measurements. The plurality of environmental air pressure measurements can be generated at a low frequency rate over one or more time periods including, for example, at one or more times before, during, and/or after an evaluation time period.

According to some examples, the process 500 includes, at step/operation 504, detecting a fragmented tympanometry stimuli. For example, the computing system 100 can detect the fragmented tympanometry stimuli based at least in part on the environmental air pressure data. For instance, the fragmented tympanometry stimuli can be based at least in part on one or more of the plurality of environmental air pressure measurements. For instance, the fragmented tympanometry stimuli can be based at least in part on one or more initiating environmental air pressure measurements generated during an initial time period of an evaluation time period. In some embodiments, the one or more initiating environmental air pressure measurements can initiate the evaluation time period.

By way of example, FIG. 6 illustrates operational examples of air pressure measurements for a fragmented tympanometry framework in accordance with one or more embodiments of the present disclosure. The operational examples include a first plurality of air pressure measurements 602 over a first evaluation time period 604, a second plurality of air pressure measurements 606 over a second evaluation time period 608, and a third plurality of air pressure measurements 610 over a third evaluation time period 612. The one or more initiating environmental air pressure measurements for a respective plurality of air pressure measurements can correspond to an initial time period of a respective measurement time period. The one or more initiating environmental air pressure measurements, for example, can trigger a respective evaluation time period. By way of example, the first evaluation time period 604 can include a first initial evaluation time period 614, the second evaluation time period 608 can include a second initial evaluation time period 616, and/or the third evaluation time period 612 can include a third initial evaluation time period 618.

The fragmented tympanometry stimuli can be based at least in part on an environmental air pressure differential corresponding to the one or more initiating environmental air pressure measurements. The environmental air pressure differential can be indicative of a change in air pressure over time. In some embodiments, the fragmented tympanometry stimuli can be detected based at least in part on a comparison between an environmental air pressure differential and a threshold pressure differential correlated to a placement of an audio device within an ear of a user. The computing system 100 can detect the environmental air pressure differential based at least in part on the one or more initiating environmental air pressure measurements over an initial evaluation time period, detect the fragmented tympanometry stimuli based at least in part on the environmental air pressure differential, and, in response to detecting the fragmented tympanometry stimuli, initiate an evaluation time period.

Turning back to FIG. 5, the computing system 100 can automatically detect the fragmented tympanometry stimuli based at least in part on an in-ear inference that an audio device has been placed within an ear of a user. The in-ear inference can be based at least in part on the environmental air pressure differential. In addition, or alternatively, the in-ear inference can be based at least in part on other sensor data such as, for example, audio data, tactile data, and/or the like that can be descriptive of the placement of the audio device within an ear of a user. In accordance with some embodiments, the computing system 100 can initiate an evaluation time during which a tympanometry test can be performed in response to the fragmented tympanometry stimuli. In some embodiments, the tympanometry test can be performed each time an audio device is placed within an ear of a user.

In some embodiments, the computing system 100 can manually detect the fragmented tympanometry stimuli based at least in part on user input (e.g., voice, touch, and/or the like). By way of example, a user can provide user input to a computing apparatus (e.g., voice input, touch input to a mobile phone, desktop computer, and/or the like) and/or an audio device (e.g., voice input, touch input to an earphone, and/or the like) to request, instruct, and/or the like the performance of a tympanometry test. In some embodiments, the computing system 100 can receive the user input, detect the fragmented tympanometry stimuli based at least in part on user input, and initiate an evaluation time during which a tympanometry test can be performed in response to the fragmented tympanometry stimuli. In some embodiments, the computing system 100 can determine that an audio device is placed within an ear of a user in response to the user input and perform the tympanometry test in response to a determination that the audio device is placed within the ear of the user.

According to some examples, the process 500 includes, at step/operation 506, in response to detecting the fragmented tympanometry stimuli for an evaluation time period, receiving ME system air pressure data for a user over the evaluation time period. In some embodiments, the computing system 100 can receive the ME system air pressure data for the user during the evaluation time period, including the initial evaluation time period, and, in response to the fragmented tympanometry stimuli, the computing system 100 can record, store, and/or otherwise retain the ME system air pressure data for analysis.

The ME system air pressure data can include a plurality of ME system air pressure measurements respectively generated at a plurality of times of the evaluation time period. The plurality of ME system air pressure measurements can be generated at a high frequency rate over the evaluation time period. The high frequency rate, for example, can be greater than the low frequency rate at which the environmental air pressure measurements are generated. By way of example, the plurality of ME system air pressure measurements can include a respective ME air pressure measurement for each first subset of milliseconds (e.g., one, five, ten, etc.) of an evaluation time period. The one or more environmental air pressure measurements can include a respective environmental air pressure measurement for each second subset of milliseconds (e.g., fifty, one hundred, two hundred, one thousand, etc.) of an evaluation time period. In some embodiments, the one or more environmental air pressure measurements can include one environmental air pressure measurement for an evaluation time period.

According to some examples, the process 500 includes, at step/operation 508, determining an adjusted air pressure for an ME system of a user. For example, the computing system 100 can determine the adjusted air pressure for an ME system of a user based at least in part on the one or more environmental air pressure measurements and the plurality of ME system air pressure measurements generated for the evaluation time period. The adjusted pressure measurements, for example, can include a delta air pressure between a respective ME pressure measurement and the last recorded environmental air pressure measurement. For example, an adjusted air pressure measurement, DeltaP, for a particular time of the evaluation time period can include the difference between an ME air pressure measurement, Pme, corresponding to the particular time of the evaluation time period and a most recent environmental air pressure measurement, Penv, corresponding to the particular time of the evaluation time period. By way of example, in some embodiments:

$$\text{Delta}P = Pme - Penv.$$

With reference to FIG. 6, in some embodiments, each of the first plurality of air pressure measurements 602, the second plurality of air pressure measurements 606, and/or the third plurality of air pressure measurements 610 can include adjusted pressure measurements. For instance, the first plurality of air pressure measurements 602 can be measured with respect to a current (or most recently recorded) first environmental air pressure measurement 620, the second plurality of air pressure measurements 606 can be measured with respect to a current (or most recently recorded) second environmental air pressure measurement 622, and/or the third plurality of air pressure measurements 610 can be measured with respect to a current (or most recently recorded) third environmental air pressure measurement 624.

Turning back to FIG. 5, according to some examples, the process 500 includes, at step/operation 510, initiating a sound stimulus. For example, in some embodiments, the computing system 100 can initiate a plurality of sound stimuli at a threshold interval during the evaluation time period. The plurality of sound stimuli can be based at least in part on incident wave data descriptive of an incident wave including one or more emitted acoustic signals emitted (e.g., by one or more speakers of an audio device) to an ME system of a user.

In some embodiments, the sound stimuli can be associated with a tympanometry test that defines a pulse duration and/or a pulse period for the plurality of sound stimuli. According to some example embodiments, the pulse duration can include fifty millisecond time period and/or the pulse period can include two hundred millisecond time period. In some embodiments, a sound stimulus of the tympanometry test can include an incident wave representative of a plurality of acoustic signals emitted across one or more frequencies over the pulse duration of the tympanometry test. The plurality of sound stimuli of the tympanometry test can include a respective sound stimulus emitted at each pulse period over a measurement time period.

In some embodiments, the sound stimulus can include one or more wideband clicks including an incident wave representative of a plurality of acoustic signals that cover a plurality of different frequencies across a frequency range of two hundred and twenty six to eight thousand hertz. For example, the tympanometry test can include a wideband tympanometry test at which a sound stimulus includes acoustic signals at each of the plurality of different frequencies across a wide frequency range such as, for example, two hundred and twenty six to eight thousand hertz.

According to some examples, the process 500 includes, at step/operation 512, receiving audio data in response to the sound stimulus. For example, the computing system 100 can receive audio data in response to the sound stimulus. The audio data can be indicative of one or more absorptance metrics for an ME system of a user. For instance, the absorptance metrics can include incident wave data and reflective wave data that can be compared to generate one or more absorbance measurements for the ME system of a user. The reflective wave data, for example, can be descriptive of a reflective wave including one or more reflected acoustic signals received (e.g., by one or more microphones of an audio device) from the ME system of the user in response to the plurality of sound stimuli emitted during the measurement time period.

In some embodiments, the audio data can be indicative of a plurality absorbance measurements for the ME system of a user over an evaluation time period. By way of example, at least a first portion of the audio data can include the incident wave data, at least a second portion of the audio data can include the reflected wave data, and/or at least a third portion of the audio data can include absorptance data. The absorptance data can include a plurality absorbance measurements for the ME system of a user over an evaluation time period based at least in part on the incident wave data and/or the reflected wave data. The absorptance data can be indicative of a respective sound absorbance associated with an ME system of a user during a respective time period after a respective sound stimuli.

In some example embodiments, the computing system 100 can initiate the plurality of sound stimuli for an evaluation time period and receive absorptance data for a plurality of evaluation time period fragments of the evaluation time period in response to the plurality of sound stimuli. By way of example, absorptance data can be received for each evaluation time period fragment in response to at least one sound stimulus of the plurality of sound stimuli preceding the evaluation time period fragment. The absorptance data for a respective evaluation time period fragment can include a plurality of absorbance measurements corresponding to a plurality of times of the evaluation time period fragment.

According to some examples, the process 500 includes, at step/operation 514, determining a pressure variability corresponding to an evaluation time period fragment. For example, the computing system 100 can determine the pressure variability corresponding to the evaluation time period fragment based at least in part on a plurality of adjusted pressure measurements corresponding to one or more times of the evaluation time period fragment. The pressure variability, for example, can be based at least in part on the plurality of adjusted pressure measurements.

FIG. 7 illustrates an operational example of a tympanometry test 700 over an evaluation time period 702 in accordance with one or more embodiments of the present disclosure. As described herein, the tympanometry test 700 can define a pulse duration 704 and/or a pulse period 706 for an evaluation time period 702. In the operational example, the evaluation time period 702 can include a plurality of seconds (e.g., seventeen, and/or the like), the pulse duration 704 can include a plurality of milliseconds (e.g., fifty, and/or the like), and/or the pulse period 706 can include another plurality of milliseconds (e.g., two hundred, and/or the like). In some embodiments, the pulse duration 704 can define a length of time of a sound stimulus. In some embodiments, the pulse period 706 can define a length of time between the beginning of two sound stimuli. The length of time between the beginning of two sound stimuli, for example, can include a time period from the initiation of a first sound stimuli to the initiation of a second, consecutive sound stimuli.

In some embodiments, the evaluation time period 702 can include a plurality of evaluation time period fragments 708. In some embodiments, an evaluation time period fragment 710 can correspond to a pulse duration 704 for an evaluation time period 702. The evaluation time period fragments 708 can be associated with a pressure variability. The pressure variability can be based at least in part on a plurality of adjusted pressure measurements corresponding to one or more times of the evaluation time period fragment. By way of example, the pressure variability can be indicative of a pressure range for the plurality of adjusted pressure measurements that defines a distance between a maximum adjusted pressure measurement and a minimum adjusted pressure measurement. As an example, a first evaluation time period fragment 712 can include a plurality of adjusted pressure measurements between fifty one and fifty two mbars such that the pressure variability of the first evaluation time period fragment 712 can be one mbar or less.

Turning back to FIG. 5, in some embodiments, the computing system 100 can implement one or more operations/steps of the fragmented tympanometry framework based at least in part on a pressure variability corresponding to an evaluation time period fragment. By way of example, in some embodiments, the computing system 100 can compare the pressure variability corresponding to an evaluation time period fragment to a threshold variability. The threshold variability can define an acceptable pressure range for performing one or more operations/steps of the fragmented tympanometry framework using an evaluation time period fragment. In some embodiments, the threshold variability can include one, two, and/or three mbars. In response to a detection that the pressure variability corresponding to an evaluation time period fragment is below the threshold variability, the computing system 100 can proceed to step/operation 404 of the process 400 in which the computing system 100 generates a tympanometry curve based at least in part on tympanometry data corresponding to the evaluation time period fragment. In addition, or alternatively, in response to a detection that the pressure variability corresponding to the evaluation time period fragment exceeds the threshold variability, the computing system 100 can be configured to discard at least a portion of the tympanometry data corresponding to the evaluation time period fragment. This process can be repeated for each evaluation time period fragment of the evaluation time period.

Turning back to FIG. 4, the fragmented tympanometry framework can include an initial audio data processing phase including a plurality of steps/operations. The initial audio data processing phase can be performed for one or more of a plurality of evaluation time period fragments of an evaluation time period. In some embodiments, the plurality of steps/operations of the initial data processing phase can be performed for a respective evaluation time period fragment in response to a determination that the pressure variability corresponding to the respective evaluation time period fragment is below the threshold variability.

According to some examples, the process 400 includes, at step/operation 404, generating a tympanometry curve based at least in part on tympanometry data received for an evaluation time period. For example, the computing system 100 can generate the tympanometry curve for an evaluation time period fragment. The tympanometry curve can be generated based at least in part on audio data indicative of a sound absorbance associated with an ME system of a user over the evaluation time period fragment. The audio data, for example, can include a plurality of absorbance measurements corresponding to the measurement time period fragment of the evaluation time period. The plurality of absorbance measurements can be associated with a plurality of different sound frequencies. By way of example, the plurality of absorbance measurements can be indicative of an absorptance of an ME system of a user relative to each of a plurality of different sound frequencies. The tympanometry curve can be representative of the plurality of absorbance measurements over the evaluation time period fragment relative to a plurality of different sound frequencies over a frequency range.

FIG. 8 illustrates operational examples of tympanometry curves 800 according to some example embodiments of the present disclosure. The tympanometry curves 800, for example, can include a first tympanometry curve 802 and a second tympanometry curve 804.

The first tympanometry curve 802 can include a plurality of first absorbance measurements including one or more first absorbance measurements 806A-F. Each first absorbance measurement can be measured at a particular frequency within a frequency range 808. The frequency range 808, for example, can include a range of two hundred and twenty six hertz to eight kilohertz. The one or more first absorbance measurements 806A-F can include a subset of a plurality of first absorbance measurements respectively generated for each frequency within the frequency range 808.

The second tympanometry curve 804 can include a plurality of second absorbance measurements including one or more second absorbance measurements 810A-F. Each second absorbance measurement can be measured at a particular frequency within the frequency range 808. The one or more second absorbance measurements 810A-F can include a subset of a plurality of first absorbance measurements respectively generated for each frequency within the frequency range 808.

Turning back to FIG. 4, according to some examples, the process 400 includes, at step/operation 406, generating a curve-pressure pair including the tympanometry curve and a correlating pressure measurement. For example, the computing system 100 can generate the curve-pressure pair including the tympanometry curve and the correlating pressure measurement. The curve-pressure pair, for example, can include the tympanometry curve labeled and/or categorized according to the correlating pressure measurement.

The correlating pressure measurement can include an adjusted air pressure measurement corresponding to the measurement time period fragment. The correlating pressure measurement, for example, can be based at least in part on pressure data indicative of a particular environmental air pressure and a particular ME air pressure during the measurement time period fragment. In some embodiments, the correlating pressure measurement can include an average, median, and/or other measurement indicative of a representative adjusted pressure measurement for the measurement time period fragment. For example, in the event that the first measurement time period fragment is associated with a plurality of different adjusted pressure measurements, the computing system 100 can determine a representative pressure measurement for the measurement time period fragment from the plurality of different pressure measurements.

According to some examples, the process 400 includes, at step/operation 408, identifying historical data based at least in part on the correlating pressure measurement. For example, the computing system 100 can identify the historical data based at least in part on the correlating pressure measurement. The historical data can be indicative of a plurality of historical curve-pressure pairs based at least in part on the correlating pressure measurement. Each historical curve-pressure pair, for example, can include a historical pressure measurement that is within a threshold distance from the correlating pressure measurement.

According to some embodiments the computing system 100 can determine whether to perform a third, metric generation, phase of the fragmented tympanometry framework based at least in part on the historical data.

FIG. 9 illustrates a block diagram of an example process 900 according to an example method for performing an initial audio data processing phase of the fragmented tympanometry framework in accordance with one or more embodiments of the present disclosure. The process 900 can be implemented by one or more computing devices, entities and/or systems described herein. For example, the process 900 includes a plurality of steps/operations that can be implemented by the computing system 100, the tympanometry system 200, the tympanometry system 300, and/or one or more combinations thereof.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

According to some examples, the process 900 includes, at step/operation 902, generating the tympanometry curve for the measurement time period fragment of the evaluation time period as described herein. The tympanometry curve can include a plurality of absorbance measurements arranged in any of a plurality of different data structures. For example, the tympanometry curve can include an array, vector, and/or the like of the plurality of absorbance measurements.

According to some examples, the process 900 includes, at step/operation 904, extracting one or more absorbance measurements from the tympanometry curve. For example, the computing system 100 can extract the one or more absorbance measurements from the plurality of absorbance measurements of the tympanometry curve. Each particular absorbance measurement of the one or more absorbance measurements can be associated with a particular dominant sound frequency of one or more threshold dominant sound frequencies.

By way of example, with reference to FIG. 8, the one or more threshold dominant sound frequencies can include one or more sound frequencies within the frequency range 808. In some embodiments, the one or more sound frequencies can be at least partially evenly spaced across the frequency range 808. In some example embodiments, the one or more threshold dominant sound frequencies can include six different sound frequencies. The six different sound frequencies can include a first threshold dominant sound frequency 812 (e.g., five hundred hertz, and/or the like), a second threshold dominant sound frequency 814 (e.g., three kilohertz, and/or the like), a third threshold dominant sound frequency 816 (e.g., four kilohertz, and/or the like) a fourth threshold dominant sound frequency 818 (e.g., five kilohertz, and/or the like), a fifth threshold dominant sound frequency 820 (e.g., six kilohertz, and/or the like), and/or a sixth threshold dominant sound frequency 822 (e.g., eight kilohertz, and/or the like).

The one or more first absorbance measurements 806A-F and/or the one or more second absorbance measurements 810A-F can include one or more extracted absorbance measurements respectively corresponding to the first threshold dominant sound frequency 812, the second threshold dominant sound frequency 814, the third threshold dominant sound frequency 816, the fourth threshold dominant sound frequency 818, the fifth threshold dominant sound frequency 820, and/or the sixth threshold dominant sound frequency 822.

Turning back to FIG. 9, according to some examples, the process 900 includes, at step/operation 906, storing the one or more extracted absorbance measurements in a historical evaluation database. For example, the computing system 100 can store the one or more extracted absorbance measurements in the historical evaluation database relative to the correlating pressure measurement. By way of example, the one or more extracted absorbance measurements can be stored in one or more data objects indicative of the correlating pressure measurement. In some embodiments, the historical evaluation database can include a plurality of frequency specific databases, each including a plurality of historical absorbance measurements for a specific threshold dominant sound frequency. Each historical absorbance measurement of a respective frequency specific database can be associated with a historical correlating pressure measurement.

The historical evaluation database can include any computer implemented data structure including, for example, one or more memory buffers, storage registers, linked lists, relational data structures, and/or the like. The historical evaluation database can be stored at least in part in one or more memory elements of the computing system 100. In addition, or alternatively, the historical evaluation database can be stored in one or more cloud storage platforms, remote servers, and/or the like.

In accordance with some embodiments, the computing system 100 can generate a performance metric for an ME system of a user based at least in part on each particular absorbance measurement and the particular dominant sound frequencies corresponding thereto.

For example, according to some examples, the process 900 includes, at step/operation 908, identifying historical data corresponding to each particular absorbance measurement of the one or more absorbance measurements. For example, the computing system 100 can identify the historical data corresponding to each particular absorbance measurement of the one or more absorbance measurements. By way of example, the historical data can include a plurality of historical absorbance measurements for each particular dominant sound frequency. The plurality of historical absorbance measurements for a particular dominant sound frequency can include one or more absorbance measurements generated at (i) the particular dominant sound frequency, and (ii) a historical pressure measurement within a threshold distance from the correlating pressure measurement. By way of example, the threshold distance from the correlating pressure measurement can include a threshold range of one or more mbars. The threshold range, for example, can include a one, five, ten, twenty mbars and/or the like.

For example, according to some examples, the process 900 includes, at step/operation 910, identifying one or more evaluation criteria for the historical data corresponding to the one or more absorbance measurements. For example, the computing system 100 can identify the one or more evaluation criteria for the historical data. The one or more evaluation criteria, for example, can include an evaluation threshold. The evaluation threshold can be indicative of a threshold number of historical pressure measurements corresponding to the correlating pressure measurement. The threshold number of historical pressure measurements, for instance, can be indicative of a number of historical pressure measurements associated with reliably generating a performance metric. The evaluation threshold can be indicative of one, two, ten, and/or any number of historical pressure measurements associated with reliably generating a performance metric.

FIGS. 10-11 illustrate operational examples of historical data for an absorbance measurement in accordance with one or more embodiments of the present disclosure.

By way of example, FIG. 10 illustrates an operational example 1000 of historical data 1002 for an absorbance measurement 806C of the first tympanometry curve 802. The historical data 1002 for the absorbance measurement 806C can include a plurality of historical absorbance measurements 1004 corresponding to the third threshold dominant sound frequency 816 at which the absorbance measurement 806C is generated. The plurality of historical absorbance measurements 1004 can correspond to one or more adjusted pressure measurements within a threshold distance from the correlating pressure measurement of the first tympanometry curve 802. The threshold distance can be defined by a threshold pressure range 1006. The threshold pressure range 1006, for example, can include one, five, ten, twenty mbars and/or the like. In some embodiments, the evaluation threshold can be indicative of at least (i) one or more historical pressure measurements respectively associated with historical correlating pressure measurements within the threshold pressure range 1006 and below the correlating pressure measurement of the first tympanometry curve 802, and/or (ii) one or more historical pressure measurements respectively associated with historical correlating pressure measurements within the threshold pressure range 1006 and above the correlating pressure measurement of the first tympanometry curve 802.

As another example, FIG. 11 illustrates an operational example 1100 of historical data 1102 for an absorbance measurement 810C of the second tympanometry curve 804. The historical data 1102 for the absorbance measurement 810C can include a plurality of historical absorbance measurements 1104 corresponding to the third threshold dominant sound frequency 816 at which the absorbance measurement 810C is generated. The plurality of historical absorbance measurements 1104 can correspond to one or more adjusted pressure measurements within a threshold distance from the correlating pressure measurement of the second tympanometry curve 804. The threshold distance can be defined by a threshold pressure range 1106. The threshold pressure range 1106, for example, can include one, five, ten, twenty mbars and/or the like. In some embodiments, the evaluation threshold can be indicative of at least (i) one or more historical pressure measurements respectively associated with historical correlating pressure measurements within the threshold pressure range 1106 and below the correlating pressure measurement of the second tympanometry curve 804, and/or (ii) one or more historical pressure measurements respectively associated with historical correlating pressure measurements within the threshold pressure range 1106 and above the correlating pressure measurement of the second tympanometry curve 804.

Turning back to FIG. 9, in some embodiments, the computing system 100 can implement one or more operations/steps of the fragmented tympanometry framework based at least in part on the number of historical pressure measurements received for the curve-pressure pair and/or one or more absorbance measurements thereof. By way of example, in response to the number of historical pressure measurements achieving and/or exceeding an evaluation threshold, the computing system 100 can proceed to step/operation 410 of the process 400 in which the computing system 100 can generate a performance metric for an ME system of a user based at least in part on a curve-pressure pair and the historical data. In addition, or alternatively, in response to the number of historical pressure measurements not achieving and/or being below the evaluation threshold, the computing system 100 can be configured to analyze a second evaluation time period fragment of the evaluation time period. This process can be repeated for each evaluation time period fragment of the evaluation time period.

Turning back to FIG. 4, according to some examples, the process 400 includes, at step/operation 410, generating a performance metric for a user based at least in part on the curve-pressure pair and the historical data. For example, the computing system 100 can generate the performance metric for an ME system of the user based at least in part on the curve-pressure pair and the historical data. The computing system 100 can generate the performance metric based at least in part on a determination that the historical data achieves the one or more evaluation criteria for the one or more absorbance measurements.

The performance metric can be descriptive of the performance of an ME system of a user. In some embodiments, the performance metric can be indicative of whether the ME system of the user has experienced a change relative to a historical performance of the ME system of the user. In addition, or alternatively, the performance metric can include a relative performance of the ME system of the user relative to the user's historical performance, the historical performance of one or more groups of the other users, and/or the like.

According to some examples, the process 400 includes, at step/operation 412, outputting an indication of the performance metric to the user. For example, the computing system 100 can output the indication of the performance metric to the user. In some embodiments, the indication of the performance metric can be representative of a variability in the performance of the ME system of the user as measured by: (i) the relative absorptance of the ME system of the user during the evaluation time period relative to the historical absorptance of the ME system of the user and/or (ii) the relative absorptance of the ME system of the user during the evaluation time period relative to an average absorptance for one or more groups of the other users.

According to some embodiments, the performance metric can be associated with one or more alert thresholds indicative of a threshold variability in the performance of the ME system of the user. In some embodiments, the computing system 100 can initiate an alert to the user in response to the performance metric exceeding the alert threshold. In some embodiments, in response to the performance metric exceeding the alert threshold, the computing system 100 can generate, using one or more machine learning models, a shape classification for the tympanometry curve and initiate an alert indicative of the shape classification.

Figure 12:
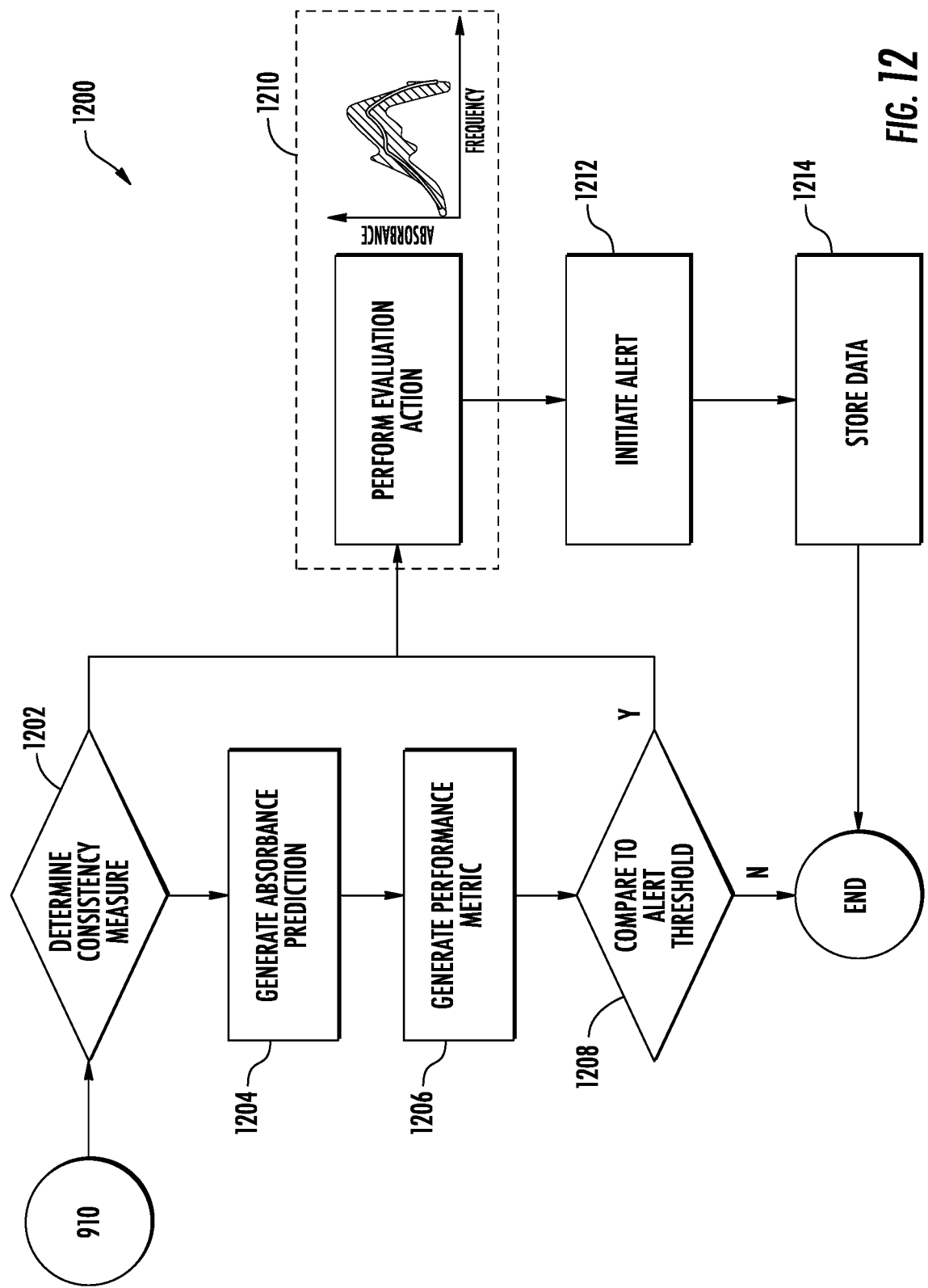

FIG. 12 illustrates a block diagram of an example process 1200 according to an example method for performing a metric generation phase of the fragmented tympanometry framework in accordance with one or more embodiments of the present disclosure. The process 1200 can be implemented by one or more computing devices, entities and/or systems described herein. For example, the process 1200 includes a plurality of steps/operations that can be implemented by the computing system 100, the tympanometry system 200, the tympanometry system 300, and/or one or more combinations thereof.

FIG. 12 illustrates an example process 1200 for explanatory purposes. Although the example process 1200 depicts a particular sequence of steps/operations, the sequence may be altered without departing from the scope of the present disclosure. For example, some of the steps/operations depicted may be performed in parallel or in a different sequence that does not materially impact the function of the process 1200. In other examples, different components of an example device or system that implements the process 1200 may perform functions at substantially the same time or in a specific sequence.

According to some examples, the process 1200 includes, at step/operation 1202, determining a consistency measure associated with the historical data. For example, the computing system 100 can determine the consistency measure associated with the historical data based at least in part on a variability of the plurality of historical absorbance measurement with respect to each other. The variability of the historical data, for example, can be based at least in part on a standard deviation of the plurality of historical absorbance measurements. By way of example, the computing system 100 can determine a standard deviation of the plurality of historical absorbance measurements.

In some embodiments, the computing system 100 can generate the performance metric in response to the standard deviation of the plurality of historical absorbance measurements achieving an evaluation threshold. By way of example, the evaluation threshold can be indicative of at least one of (i) a threshold number of the plurality of historical absorbance measurements (as described herein) and/or (ii) a threshold standard deviation of the plurality of historical absorbance measurements. The threshold standard deviation can be based at least in part on a reliability of performance metrics generated using historical absorbance measurements and can include any threshold ratio such as, as examples, 0.1, 0.3, 4, and/or the like. In some embodiments, the threshold standard deviation can be based at least in part on a confidence level associated with one or more predictions generated based at least in part on the plurality of historical absorbance measurements. The confidence level, for example, can be associated with a machine learning model and/or other regression algorithm configured to generate a prediction based at least in part on the plurality of historical absorbance measurements.

According to some examples, the process 1200 includes, at step/operation 1204, generating an absorbance prediction for a particular absorbance measurement of the one or more absorbance measurements. For example, the computing system 100 can generate an absorbance prediction for a particular dominant sound frequency corresponding to the particular absorbance measurement at the correlating pressure measurement. The absorbance prediction can be based at least in part on the plurality of historical absorbance measurements corresponding to the particular dominant sound frequency.

By way of example, with reference to FIGS. 10 and 11, an absorbance prediction 1008 can be generated for the absorbance measurement 806C based at least in part on the plurality of historical absorbance measurements 1004. The absorbance prediction 1008 can be generated, using one or more regression based models, based at least in part on the plurality of historical absorbance measurements 1004. As another example, the absorbance prediction 1108 can be generated for the absorbance measurement 810C based at least in part on the plurality of historical absorbance measurements 1104. The absorbance prediction 1108 can be generated, using one or more regression based models, based at least in part on the plurality of historical absorbance measurements 1104. The one or more regression based models can include any prediction, inference, and/or regression algorithm. In some embodiments, the regression based models can include one or more machine learning models such as, for example, one or more linear regression, ridge regression, neural network regression, lasso regression, decision tree regression, random forest, and/or the like.

According to some examples, the process 1200 includes, at step/operation 1206, generating the performance metric based at least in part on a comparison between the absorbance prediction and the particular absorbance measurement. For example, the computing system 100 can generate the performance metric based at least in part on the comparison between the absorbance prediction and the particular absorbance measurement. The performance metric, for example, can include distance between the absorbance prediction and the particular absorbance measurement.

By way of example, with reference to FIGS. 10 and 11, a performance metric for the absorbance measurement 806C can be based at least in part on the error distance 1010 between the absorbance prediction 1008 and the absorbance measurement 806C. The error distance 1010 can be representative of a change in the performance of an ME system of a user with respect to the historical performance of the ME system of the user. As another example, a performance metric for the absorbance measurement 810C can be based at least in part on the error distance 1110 between the absorbance prediction 1108 and the absorbance measurement 810C. The error distance 1110 can be representative of a change in the performance of an ME system of a user with respect to the historical performance of the ME system of the user.

In some embodiments, the performance metric can include a population-based performance metric that is based at least in part on a plurality of historical absorbance measurements associated with a plurality of different users. The population-based performance metric, for example, can include a distance between the particular absorbance measurement and a normal curve based at least in part on the plurality of historical absorbance measurements associated with a plurality of different users.

FIG. 13 illustrates an operational example 1300 of a population-based performance analysis 1300 in accordance with one or more embodiments of the present disclosure. The population-based performance analysis 1300 can include generating a population-based performance metric for an absorbance measurement 1304 based at least in part on an error distance 1302 between the absorbance measurement 1304 and an edge of a normal curve 1306 for a plurality of users. The normal curve 1306, for example, can be based at least in part on a plurality of historical absorbance measurements generated for each of the plurality of users. In some embodiments, the normal curve 1306 can include a block of equalization for compensating for difference in frequency response among various audio devices respectively utilized by each of the plurality of users.

Turning back to FIG. 12, in accordance with some embodiments, the computing system 100 can generate an aggregated performance metric for the ME system of the user based at least in part on the performance metric for the particular absorbance measurement. By way of example, the aggregated performance metric can include the sum of the error distances generated for each of the one or more absorbance measurements. By way of example, the computing system 100 can generate one or more frequency specific performance metrics corresponding to each of the one or more absorbance measurements (e.g., absorbance measurements associated with a threshold dominant frequency, and/or the like). A particular frequency specific performance metric for each particular absorbance measurement can be based at least in part on a comparison (e.g., error distances, and/or the like) between the particular absorbance measurement and a corresponding absorbance prediction. The aggregated performance metric can include an aggregation of a frequency specific performance metric for each respective absorbance measurement of the one or more absorbance measurements. For instance, the computing system can aggregate each of the one or more frequency specific performance metrics to generate the aggregated performance metric for a user's ME system.

By way of example, the aggregated performance metric can include the sum of the error distances generated for each absorbance measurement of the tympanometry curve that corresponds to a threshold dominant frequency. The aggregated performance metric, Agg Metric, for an individual user, for example, can include the summation of the absolute distance between each particular absorbance measurement, evaluated, and a corresponding absorbance prediction, estimated, for each threshold dominant frequency, x, as denoted by:

$$Agg\ Metric = \sum_{i=1}^{x} abs(Estimated_i - Evaluated_i)$$

In some embodiments, the aggregated performance metric can include a weighted aggregated performance metric. The weighted aggregated performance metric can include the weighted sum of the error distances generated for each absorbance measurement of the tympanometry curve that corresponds to a threshold dominant frequency. By way of example, a respective absorbance measurement can be weighted based at least in part on the threshold dominant frequency corresponding to the respective absorbance measurement. As an example, absorbance measurements associated with a more reliable threshold dominant frequency can be assigned a greater weight than absorbance measurements associated with a less reliable threshold dominant frequency. The reliability of a respective threshold dominant frequency, for example, can be based at least in part on historical data (e.g., one or more previous performance metrics, absorbance measurements, and/or the like).

According to some examples, the process 1200 includes, at step/operation 1208, comparing a performance metric for a user's ME system to an alert threshold. For example, the computing system 100 can compare a performance metric for a particular frequency and/or an aggregated performance metric for the user's ME system to the alert threshold. The alert threshold can be indicative of a threshold variability in the performance of the ME system of a user. In some examples, the alert threshold can include a threshold error distance between one or more absorbance measurements and one or more corresponding absorbance predictions. By way of example, the threshold error distances can include one or more absorbance ranges (e.g., 0.1, 2, 0.3, and/or the like).

In some embodiments, the alert threshold can be based at least in part on one or more historical performance metrics for the user. For instance, the alert threshold can be based at least in part on one or more previous error distances measured for the user. By way of example, the alert threshold can be based at least in part on an average, median, maximum, minimum, and/or the like of a plurality of previous error distances measured for the user. In some embodiments, the alert threshold can include one or more absorbance ranges (e.g., 0.1, 0.2, 0.3, and/or the like) in addition to the average, median, maximum, minimum, and/or the like of the plurality of previous error distances measured for the user.

According to some examples, the process 1200 includes, at step/operation 1210, performing an evaluation action in response to the performance metric exceeding the alert threshold. For example, the computing system 100 can, using a machine learning model, generate a shape classification for the tympanometry curve in response to the performance metric exceeding the alert threshold.

By way of example, the machine learning model can include a data entity that describes parameters, hyper-parameters, and/or defined operations of a model (e.g., model including at least one of one or more rule-based layers, one or more layers that depend on trained parameters, etc.). The machine-learning model can include a shape classification model that can be trained to generate a hearing impairment label for a user based at least in part on the geometry of a tympanometry curve.

The shape classification model can include one or more of any type of machine-learning model including one or more supervised, unsupervised, and/or reinforcement learning models. In some embodiments, the shape classification model can include an artificial neural network configured to output an impairment classification for a user based at least in part on an input tympanometry curve. The impairment classification can include a general classification (e.g., normal, abnormal, and/or the like), a type classification (e.g., type A, type B, type C, type As, type Ad, type ECV, and/or the like), a dysfunction classification (e.g., Eustachian tube dysfunction, ME pathology, membrane perforation, patent grommet, and/or the like), and/or the like.

According to some examples, the process 1200 includes, at step/operation 1212, initiating an alert in response to the performance metric exceeding the alert threshold. For example, the computing system 100 can, in response to the performance metric exceeding the alert threshold, initiate the alert to the user. The alert, for example, can be indicative of a change in the ME system performance of the user.

In some embodiments, the alert is based at least in part on the shape classification. By way of example, in some embodiments, in response to the performance metric exceeding the alert threshold, the computing system 100 can generate, using one or more machine learning models, a shape classification for the tympanometry curve and initiate an alert indicative of the shape classification to the user.

According to some examples, the process 1200 includes, at step/operation 1214, storing data indicative of the fragmented tympanometry test. For example, the computing system 100 can store the data indicative of the fragmented tympanometry test. The data indicative of the fragmented tympanometry test can be indicative of the shape classification, an alert provided to the user, one or more performance metrics, absorbance measurements, absorbance predictions, and/or the like.

According to some examples, the process 1200 includes, at step/operation 1216, completing the tympanometry test. For example, the computing system 100 can complete the tympanometry test in response to initiating an alert to the user at step/operation 1212 and/or determining that the performance metric does not exceed the alert threshold as step/operation 1208. In some embodiments, completing the tympanometry test can include initiating a second tympanometry iteration to analyze a second evaluation time period fragment of the evaluation time period. By way of example, the evaluation time period fragment can include a first evaluation time period fragment of a plurality of evaluation time period fragments of the evaluation time period. In some embodiments, the computing system 100 can initiate a tympanometry iteration for each of the plurality of evaluation time period fragments of the evaluation time period.

FIG. 14 illustrates an example calibration technique for an audio device in accordance with one or more embodiments of the present disclosure. In some embodiments, an audio device (e.g., audio device 210, audio device 310, and/or the like) can be calibrated to determine one or more calibration characteristics for the audio device. The one or more calibration characteristics can be indicative of a max incident power 1402 and/or a measured in ear power 1404 for the audio device. The max incident power 1402 and/or a measured in ear power 1404 can be applied to one or more absorbance measurements to generate calibrated sound absorbance measurements tailored to the audio device. By way of example, the max incident power 1402 and/or a measured in ear power 1404 can be applied to a plurality of absorbance measurements 1406 indicative of a comparison (e.g., P(f)–Q(f)) between an incident energy P(f) indicative of an incident wave emitted to a ME system of a user and a total energy Q(f) indicative of a recorded wave from the ME system of the user to generate a reflectance index 1408 for the ME system. The reflectance index 1408 can be leveraged to generate calibrated sound absorbance measurements 1410 for the ME system that are tailored to a specific audio device.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to fragmented wideband tympanometry techniques for true wireless stereo, however, one skilled in the art may recognize that such principles may be applied to any audio device. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While this detailed description has set forth some embodiments of the present disclosure, the appended claims cover other embodiments of the present disclosure which differ from the described embodiments according to various modifications and improvements. For example, the appended claims can cover any form of fragmented wideband tympanometry techniques as utilized with true wireless stereo and/or any other audio device.

Within the appended claims, unless the specific term "means for" or "step for" is used within a given claim.

The invention claimed is:

1. A computing system, comprising:
one or more processors; and
a memory, configured to execute one or more instructions to:
generate a tympanometry curve based at least in part on audio data indicative of a sound absorbance associated with a middle ear (ME) system over an evaluation time period fragment;
generate a curve-pressure pair comprising the tympanometry curve and a correlating pressure measurement;
identify historical data indicative of a plurality of historical curve-pressure pairs based at least in part on the correlating pressure measurement, wherein a historical curve-pressure pair comprises a historical pressure measurement that is within a threshold distance from the correlating pressure measurement;
generate a performance metric for the ME system based at least in part on the curve-pressure pair and the historical data; and
output an indication of the performance metric to a user.

2. The computing system of claim 1, wherein:
the correlating pressure measurement is based at least in part on pressure data indicative an environmental air pressure and an ME system air pressure corresponding to the evaluation time period fragment, and
the correlating pressure measurement is indicative of the ME system air pressure relative to the environmental air pressure.

3. The computing system of claim 2, wherein the pressure data comprises one or more environmental air pressure measurements and a plurality of ME system air pressure measurements during an evaluation time period comprising the evaluation time period fragment, and wherein generating the tympanometry curve based at least in part on the audio data comprises:
determining a variability of at least one portion of the pressure data corresponding to the evaluation time period fragment of the evaluation time period; and
in response to a detection that the variability of the at least one portion of the pressure data is below a threshold variability, generating the tympanometry curve based at least in part on the audio data.

4. The computing system of claim 3, wherein the computing system is further configured to:
initiate a plurality of sound stimuli for the evaluation time period;
receive the audio data for the evaluation time period fragment in response to at least one sound stimulus of the plurality of sound stimuli; and
in response to the detection that the variability of the at least one portion of the pressure data is below the threshold variability, generating the tympanometry curve based at least in part on the audio data.

5. The computing system of claim 3, wherein:
(i) the one or more environmental air pressure measurements are generated at a low frequency over the evaluation time period, and
(ii) the plurality of ME system air pressure measurements are generated at a high frequency over the evaluation time period fragment,
wherein the high frequency exceeds the low frequency.

6. The computing system of claim 5, wherein the computing system is further configured to:
detect an environmental air pressure differential based at least in part on the one or more environmental air pressure measurements; and
in response to the environmental air pressure differential, initiate the evaluation time period.

7. The computing system of claim 1, wherein the tympanometry curve comprises a plurality of absorbance measurements relative to a plurality of different sound frequencies, and the computing system is further configured to:
extract one or more absorbance measurements from the plurality of absorbance measurements, wherein a particular absorbance measurement of the one or more absorbance measurements is associated with a particular sound frequency of one or more threshold dominant sound frequencies;
store the one or more absorbance measurements in a historical evaluation database relative to the correlating pressure measurement; and generate the performance metric for the ME system based at least in part on the one or more absorbance measurements.

8. The computing system of claim 7, wherein:
the historical data comprises a plurality of historical absorbance measurements corresponding to the particular sound frequency and the correlating pressure measurement,
the plurality of historical absorbance measurements are associated with one or more historical pressure measurements, and
the one or more historical pressure measurements are within a threshold pressure range to the correlating pressure measurement.

9. The computing system of claim 8, wherein the computing system is further configured to:
generate an absorbance prediction corresponding to the particular sound frequency and the correlating pressure measurement based at least in part on the plurality of historical absorbance measurements; and
generate the performance metric based at least in part on a comparison between the absorbance prediction and the particular absorbance measurement.

10. The computing system of claim 8, wherein the computing system is further configured to:
determine at least one of (i) a number of the plurality of historical absorbance measurements or (ii) a standard deviation of the plurality of historical absorbance measurements; and
generate the performance metric in response to at least one of (i) the number or (ii) the standard deviation of the plurality of historical absorbance measurements achieving an evaluation threshold.

11. The computing system of claim 8, wherein generating the performance metric, comprises:
generating a frequency specific performance metric for each respective absorbance measurement of the one or more absorbance measurements; and
generating the performance metric based at least in part on an aggregation of the frequency specific performance metric for each respective absorbance measurement of the one or more absorbance measurements.

12. The computing system of claim 1, wherein the computing system is further configured to:
in response to the performance metric exceeding an alert threshold, initiate an alert to the user.

13. The computing system of claim 12, wherein the computing system is further configured to:
in response to the performance metric exceeding the alert threshold, generate, using a machine learning model, a shape classification for the tympanometry curve, wherein the alert is based at least in part on the shape classification.

14. The computing system of claim 13, wherein the alert threshold is based at least in part on one or more historical performance metrics for the user.

15. The computing system of claim 1, wherein the computing system comprises a tympanometry processing apparatus that is communicatively coupled to an audio device, wherein the audio device comprises one or more air pressure sensors, one or more speakers, and one or more microphones, wherein the computing system is further configured to:
receive, from the audio device, pressure data indicative an environmental air pressure and an ME system air pressure corresponding to the evaluation time period fragment; and
receive, from the audio device, the audio data corresponding to the evaluation time period fragment.

16. The computing system of claim 15, wherein the one or more microphones comprise at least one ME system microphone oriented with respect to the ME system of the user, and wherein the audio data is generated by the audio device using the at least one ME system microphone.

17. The computing system of claim 15, wherein the audio device is a true wireless stereo and the tympanometry processing apparatus is a mobile phone.

18. The computing system of claim 15, wherein the audio data is based at least in part on one or more calibration characteristics associated with the audio device.

19. A computer-implemented method comprising:
generating a tympanometry curve based at least in part on audio data indicative of a sound absorbance associated with a middle ear (ME) system over an evaluation time period fragment;
generating a curve-pressure pair comprising the tympanometry curve and a correlating pressure measurement;
identifying historical data indicative of a plurality of historical curve-pressure pairs based at least in part on the correlating pressure measurement, wherein a historical curve-pressure pair comprises a historical pressure measurement that is within a threshold distance from the correlating pressure measurement;
generating a performance metric for the ME system based at least in part on the curve-pressure pair and the historical data; and
outputting an indication of the performance metric to a user.

20. A computing apparatus, comprising:
a processor; and
a memory storing instructions that, when executed by the processor, configure the computing apparatus to:
generate a tympanometry curve based at least in part on audio data indicative of a sound absorbance associated with a middle ear (ME) system over an evaluation time period fragment;
generate a curve-pressure pair comprising the tympanometry curve and a correlating pressure measurement;
identify historical data indicative of a plurality of historical curve-pressure pairs based at least in part on the correlating pressure measurement, wherein a historical curve-pressure pair comprises a historical pressure measurement that is within a threshold distance from the correlating pressure measurement;
generate a performance metric for the ME system based at least in part on the curve-pressure pair and the historical data; and
output an indication of the performance metric to a user.

* * * * *